(12) United States Patent
Vyas et al.

(10) Patent No.: US 7,239,271 B1
(45) Date of Patent: Jul. 3, 2007

(54) PARTIAL ALMANAC COLLECTION SYSTEM

(75) Inventors: Hemali Vyas, South Pasadena, CA (US); Gengsheng Zhang, Cupertino, CA (US); Chiayee Steve Chang, San Jose, CA (US); Lionel Jacques Garin, Palo Alto, CA (US); Ashutosh Pande, San Jose, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 10/666,551

(22) Filed: Sep. 18, 2003

Related U.S. Application Data

(63) Continuation-in-part of application No. PCT/US03/25821, filed on Aug. 15, 2003.

(60) Provisional application No. 60/403,836, filed on Aug. 15, 2002.

(51) Int. Cl.
*G01S 5/04* (2006.01)

(52) U.S. Cl. .............................. 342/357.12; 342/357.13

(58) Field of Classification Search .......... 342/357.03, 342/357.06, 357.09, 357.12, 357.13; 701/208, 701/213, 215
See application file for complete search history.

(56) References Cited

U.S. PATENT DOCUMENTS

| | | | |
|---|---|---|---|
| 5,825,327 A | 10/1998 | Krasner | |
| 5,841,396 A | 11/1998 | Krasner | |
| 5,945,944 A | 8/1999 | Krasner | |
| 6,064,336 A | 5/2000 | Krasner | |
| 6,133,874 A | 10/2000 | Krasner | |
| 6,150,980 A | 11/2000 | Krasner | |
| 6,185,427 B1 | 2/2001 | Krasner et al. | |
| 6,208,290 B1 | 3/2001 | Krasner | |
| 6,215,441 B1 | 4/2001 | Moeglein et al. | |
| 6,256,475 B1 | 7/2001 | Vannucci | |
| 6,259,399 B1 | 7/2001 | Krasner | |
| 6,313,786 B1 | 11/2001 | Sheynblat et al. | |
| 6,389,291 B1 | 5/2002 | Pande et al. | |
| 6,400,314 B1 | 6/2002 | Krasner | |
| 6,411,254 B1 | 6/2002 | Moeglein et al. | |
| 6,421,002 B2 | 7/2002 | Krasner | |
| 6,433,734 B1 | 8/2002 | Krasner | |
| 6,480,788 B2* | 11/2002 | Kilfeather et al. | .......... 701/213 |
| 6,915,210 B2* | 7/2005 | Longhurst et al. | .......... 701/213 |
| 2002/0049536 A1 | 4/2002 | Gaal | |
| 2002/0111171 A1* | 8/2002 | Boesch et al. | .............. 455/456 |
| 2002/0135510 A1 | 9/2002 | Bruno et al. | |
| 2004/0198449 A1* | 10/2004 | Forrester et al. | ............ 455/561 |

FOREIGN PATENT DOCUMENTS

| | | |
|---|---|---|
| EP | 1 056 306 A | 11/2000 |
| EP | 0 880 713 B | 8/2003 |

OTHER PUBLICATIONS

B.W. Parkinson—J. J. Spilker: "Global Positioning System: Theory and Applications—vol. I", 1996, American Institute of Aeronautics and Astronautics, XP002318287, p. 122-149.

* cited by examiner

*Primary Examiner*—Dao Phan
(74) *Attorney, Agent, or Firm*—The Eclipse Group LLP

(57) ABSTRACT

A partial almanac collection system is disclosed. The partial almanac collection system includes a global positioning system ("GPS") module, and a controller in signal communication with the GPS module and the call processor, the controller instructing the GPS module to collect piecewise almanac data in response to a request from the call processor.

98 Claims, 16 Drawing Sheets

PARTIAL ALMANAC COLLECTION SYSTEM

CROSS REFERENCE TO RELATED APPLICATIONS

This application is a continuation-in-part of PCT application serial No. PCT/US03/25821, filed on Aug. 15, 2003, and titled "INTERFACE FOR A GPS SYSTEM," which claimed the benefit of U.S. provisional patent application Ser. No. 60/403,836, filed on Aug. 15, 2002, and titled "INTERFACE FOR SATPS SYSTEMS," which are both herein incorporated by reference.

BACKGROUND OF THE INVENTION

1. Field of the Invention

This invention relates generally to global positioning systems ("GPS"). In particular, this invention relates to an almanac collection system for collecting piecewise almanac information from a GPS satellite.

2. Related Art

The worldwide utilization of wireless devices (also known as "mobile devices") such as two-way radios, portable televisions, Personal Digital Assistants ("PDAs"), cellular telephones (also known as "wireless telephones," "wireless phones," "mobile telephones," "mobile phones," and/or "mobile stations"), satellite radio receivers and Satellite Positioning Systems ("SATPS") such as the United States ("U.S.") Global Positioning System ("GPS"), also known as NAVSTAR, is growing at a rapid pace. As the number of people employing wireless devices increases, the number of features offered by wireless service providers also increases, as does the integration of these wireless devices in other products.

Since the creation of the NAVSTAR by the Joint Program Office ("JPO") of U.S. Department of Defense ("DoD") in the early 1970s, numerous civilian applications have arisen that utilize new technologies associated with GPS. These new technologies include, as examples, personal GPS receivers that allow a user to determine their position on the surface of the Earth and numerous communication networks such as the Code Division Multiple Access ("CDMA") and Time Division Multiple Access ("TDMA") cellular networks that utilize GPS clock references to operate. As a result of these new technologies, there is a growing demand for mobile devices that can transmit, among other things, their locations in emergency situations, incorporate positional information with communication devices, locate and track tourists, children and the elderly, and provide security of valuable assets.

In general, GPS systems are typically satellite (also known as "space vehicle" or "SV") based navigation systems. Examples of GPS include but are not limited to the United States ("U.S.") Navy Navigation Satellite System ("NNSS") (also known as TRANSIT), LORAN, Shoran, Decca, TACAN, NAVSTAR, the Russian counterpart to NAVSTAR known as the Global Navigation Satellite System ("GLONASS") and any future Western European GPS such as the proposed "Galileo" program.

The NAVSTAR GPS (henceforth referred to simply as "GPS") was originally developed as a military system to fulfill the needs of the U.S. military; however, the U.S. Congress later directed the DoD to also promote GPS's civilian uses. As a result, GPS is now a dual-use system that may be accessed by both U.S. government agencies (such as the military) and civilians. The GPS system is described in *GPS Theory and Practice*, Fifth ed., revised edition by Hofmann-Wellenhof, Lichtenegger and Collins, Springer-Verlag Wien New York, 2001, which is fully incorporated herein by reference.

Typically, the utilization of GPS includes identifying precise locations on the Earth and synchronizing telecommunication networks such as military communication networks and the cellular telephone networks such as CDMA and TDMA type systems. Additionally, with the advent of the U.S. Congress' mandate, through the Federal Communications Commission ("FCC"), for a cellular telephone network that is capable of providing a cellular telephone user's location within 50 feet in emergency situations (generally known as "Enhanced 911" service or "E911"), GPS is being employed for both location determination and synchronization in many cellular applications.

In general, the array of GPS satellites (generally known as a "GPS constellation") transmit highly accurate, time coded information that permits a GPS receiver to calculate its location in terms of latitude and longitude on Earth as well as the altitude above sea level. GPS is designed to provide a base navigation system with accuracy within approximately 100 meters for non-military users and even greater precision for the military and other authorized users (with Selective Availability "SA" set to ON).

GPS typically comprises three major system segments: space, control, and user. The space segment of GPS is a constellation of satellites orbiting above the Earth that contain transmitters, which send highly accurate timing information to GPS receivers on earth. At present, the implemented GPS constellation includes 21 main operational satellites plus three active spare satellites. These satellites are arranged in six orbits, each orbit containing three or four satellites. The orbital planes form a 55° angle with the equator. The satellites orbit at a height of approximately 10,898 nautical miles (20,200 kilometers) above the Earth with orbital periods for each satellite of approximately 12 hours.

As an example, in NAVSTAR, each of the orbiting satellites contains four highly accurate atomic clocks (two rubidium and two cesium). These atomic clocks provide precision timing pulses used to generate a unique binary code (also known as a pseudorandom "PRN-code" or pseudo noise "PN-code") that is transmitted to Earth. The PRN-code identifies the specific satellite in the GPS constellation. The satellite also transmits a set of digitally coded information that includes two types of orbital parameters for determining the locations-in-space for the satellites known as almanac data and ephemeris data.

The ephemeris data (also known as "ephemerides") defines the precise orbit of the satellite. The ephemeris data indicates where the satellite is at any given time, and its location may be specified in terms of the satellite ground track in precise latitude and longitude measurements. The information in the ephemeris data is coded and transmitted from the satellite providing an accurate indication of the position of the satellite above the Earth at any given time. Typically, current ephemeris data is sufficient for determining locations-in-space to a few meters or a few tens of meters at current levels of SA. A ground control station updates the Ephemeris data each hour to ensure accuracy. However, after about two hours the accuracy of the ephemeris data begins to degrade.

The almanac data is a subset of the ephemeris data. The almanac data includes less accurate information regarding the location of all the satellites in the constellation. The almanac data includes relatively few parameters and is generally sufficient for determining locations-in-space to a few kilometers. Each GPS satellite broadcasts the almanac data for all the GPS satellites in the GPS constellation on a twelve and one-half ("12.5") minute cycle. Therefore, by tracking only one satellite, the almanac data of all the other satellites in orbit are obtained. The almanac data is updated every few days and is useful up to approximately several months. Because of its relatively long lifetime, GPS receivers that have been off for more than a few hours typically utilize the almanac data to determine which GPS satellites are in-view. However, both the almanac and ephemeris data are valid only for a limited amount of time. As such, the location of the satellites based on this information is less and less accurate as the almanac and ephemeris data ages unless the data is updated at appropriate intervals in time.

The ephemeris data includes three sets of data available to determine position and velocity vectors of the satellites in a terrestrial reference frame at any instant. These three sets of data include almanac data (as mentioned earlier), broadcast ephemerides, and precise ephemerides. The data differs in accuracy and is either available in real-time or after the fact. Typically, the purpose of the almanac data is to provide the user with less precise data to facilitate receiver satellite search or for planning tasks such as the computation of visibility charts. The almanac data are updated at least every six days and are broadcast as part of the satellite message. The almanac data within the satellite message essentially contain parameters for the orbit and satellite clock correction terms for all satellites. The GPS almanac data is described in "GPS Interface Control Document ICD-GPS-200" for the "NAVSTAR GPS Space Segment and Navigation User Interfaces" published by NavTech Seminars & NavTech Book and Software Store, Arlington, Va., reprinted February, 1995, which is herein incorporated by reference.

In a typical operation example, when a GPS receiver is first turned on (generally known as a "cold start") or woken up from a long stand-by condition of more than a few hours, the GPS receiver will scan the GPS spectrum to acquire a GPS signal transmitted from an available GPS satellite. Once the GPS signal is acquired the GPS receiver will then download the GPS almanac data for the GPS constellation, the ephemeris data and clock correction information from the acquired GPS satellite. Once the almanac data is downloaded, the GPS satellite will then scan the GPS spectrum for the available (i.e., the "in-view") GPS satellites as indicated by the almanac data. Ideally, given sufficient time and assuming the environmental conditions surrounding the GPS receiver allow the GPS receiver to acquire two to three additional in-view GPS satellites, the GPS receiver receives both distance and timing information from the three to four satellites and calculates its position on the Earth.

Unfortunately, for many applications both time and environmental conditions may limit a GPS receiver's ability to download the GPS almanac data, especially in indoor or limited sky-view conditions. The problems associated with time are usually described by the Time-to-First-Fix ("TTFF") values. If the TTFF values are high, the GPS receiver will have limited applications because it will take too long to determine its initial location.

As an example, in a wireless or cellular telephone application, a cellular telephone or personal digital assistant ("PDA") with an integrated GPS receiver would have to wait at least 12.5 minutes (assuming perfect environmental conditions with all necessary in-view satellites being visible) for the GPS receiver to download the GPS almanac before making a call. This would be unacceptable for most applications.

In cellular telephone applications, this limitation would be even more unacceptable in view of the E911 mandate that requires that a cellular telephone send its position information to emergency personal in an E911 emergency call. If a user finds themselves within an emergency situation with a GPS enabled cellular telephone in their possession that is turned off or has been in a long stand-by condition, the user would have to generally first wait at least 12.5 minutes of time with continuous uninterrupted satellite visibility (because the GPS receiver typically needs a strong signal to acquire the almanac and/or ephemeris data reliably) before being able to make an emergency call that would transmit the user's location to the emergency personnel. In a typical metropolitan or naturally obstructed environment, the wait may be longer than 12.5 minutes because the environmental conditions may make acquiring the first satellite more difficult. It is appreciated that this would be unacceptable, especially in a life-threatening situation.

Past approaches to reduce the amount of time required to download the almanac data have included storing some sort of almanac (such as factory installed almanac data) in a memory unit (such as a read-only memory "ROM") in the GPS receiver. Typically, this pre-stored almanac data is utilized to reduce the TTFF in a cold-start condition.

In this approach, the cold-start condition usually still has a relatively long TTFF time due to the uncertainties associated with the satellite positions and the age of the pre-stored almanac. Once the first fix is acquired, this GPS receiver can then download the updated almanac data from the acquired satellite and update the ROM (or a read-access memory "RAM") for future use. However, this approach still requires that the GPS receiver receive the updated almanac data (i.e., receiving a "fresh" copy of the almanac data) from the satellites for future acquisitions. Receiving the updated almanac data will still require significant amounts of time that will affect the performance of the GPS receiver.

Therefore, there is a need for a system capable of obtaining almanac information in a more efficient manner that overcomes the previously mentioned problems.

In response to these problems, aiding approaches have been developed for mobile telephones that assist the GPS receiver by providing aiding data from a communication module (also known as a "call processor" or "CP") for such purposes as acquisition, location calculation and/or sensitivity improvement. Examples of some of these aiding approaches include systems described by U.S. Pat. No. 6,433,734, titled "Method and apparatus for determining time for GPS receivers," issued on Aug. 13, 2002 to inventor Krasner; U.S. Pat. No. 6,421,002, titled "GPS receiver utilizing a communication link," issued on Jul. 16, 2002 to inventor Krasner; U.S. Pat. No. 6,411,254, titled "Satellite positioning reference system and method," issued on Jun. 25, 2002 to inventors Moeglein et al.; U.S. Pat. No. 6,400,314, titled "GPS receiver utilizing a communication link," issued on Jun. 4, 2002 to inventor Krasner; U.S. Pat. No. 6,313,786, titled "Method and apparatus for measurement processing of satellite positioning system (SPS) signals," issued Nov. 6, 2001 to inventors Sheynblat et al.; U.S. Pat. No. 6,259,399, titled "GPS receivers and garments containing GPS receivers and methods for using these GPS receivers," issued on Jul. 10, 2001 to inventor Krasner; U.S. Pat. No. 6,215,441, titled "Satellite positioning reference system and method," issued on Apr. 10, 2001 to inventors Moeglein et al.; U.S. Pat. No. 6,208,290, titled "GPS receiver utilizing a communication link," issued on Mar. 27, 2001 to inventor Krasner; U.S. Pat. No. 6,185,427, titled "Distributed satellite position system processing and application network," issued on Feb. 6, 2001 to inventors Krasner et al.; U.S. Pat. No. 6,150,980, titled "Method and apparatus for determining time for GPS receivers," issued on Nov. 21, 2000 to inventor Krasner; U.S. Pat. No. 6,133,874, titled "Method and apparatus for acquiring satellite positioning system signals," issued on Oct. 17, 2000 to inventor Krasner; U.S. Pat. No. 6,064,336, titled "GPS receiver utilizing a communication link," issued on May 16, 2000 to inventor Krasner; U.S. Pat. No. 5,945,944, titled "Method and apparatus for determining time for GPS receivers," issued. on Aug. 31, 1999 to inventor Krasner; U.S. Pat. No. 5,825,327, titled "GPS receiver utilizing a communication link," issued on Nov. 24, 1998 to inventor Krasner; and U.S. Pat. No. 5,841,396, titled "GPS receivers and garments containing GPS receivers and methods for using these GPS receivers," issued on Oct. 20, 1998 to inventor Krasner, which are herein incorporated by reference. Unfortunately, these aiding approaches in wireless networks are typically cellular network (i.e., cellular platforms such as TDMA, GSM, CDMA, etc.) and vendor specific, and are provided by Geolocation Server Stations located at the cellular network. As a result, the GPS receiver in the mobile telephone (also known as a "mobile station" or "MS") must typically be compatible with the Geolocation Server Station of the cellular network.

However, many network-aiding systems are not yet implemented and of those that are implemented, they typically incorporate Geolocation Server Stations that utilize Geolocation Server Station protocols that are not compatible with each other. Therefore, there is also a need for a system capable of allowing a GPS receiver to operate with the numerous Geolocation Server Stations that is Geolocation Server Station protocol independent.

SUMMARY

A partial almanac collection system is disclosed. The partial almanac collection system may include a global positioning system ("GPS") module, and a controller in signal communication with the GPS module and the call processor, the controller instructing the GPS module to collect piecewise almanac data in response to a request from the call processor.

In operation, the partial almanac collection system collects a piecewise GPS almanac by receiving a request for a GPS almanac download from a call processor and in response receives the GPS almanac in a piecewise process. The piecewise process may include receiving a plurality of sub-sets of the GPS almanac and storing the plurality of sub-sets of the GPS almanac into a memory device. Additionally, the piecewise process may further include determining when the last sub-set of the plurality of sub-sets of the GPS almanac has been received and combining all the sub-sets of the plurality of sub-sets of the GPS almanac to create a full GPS almanac.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1:
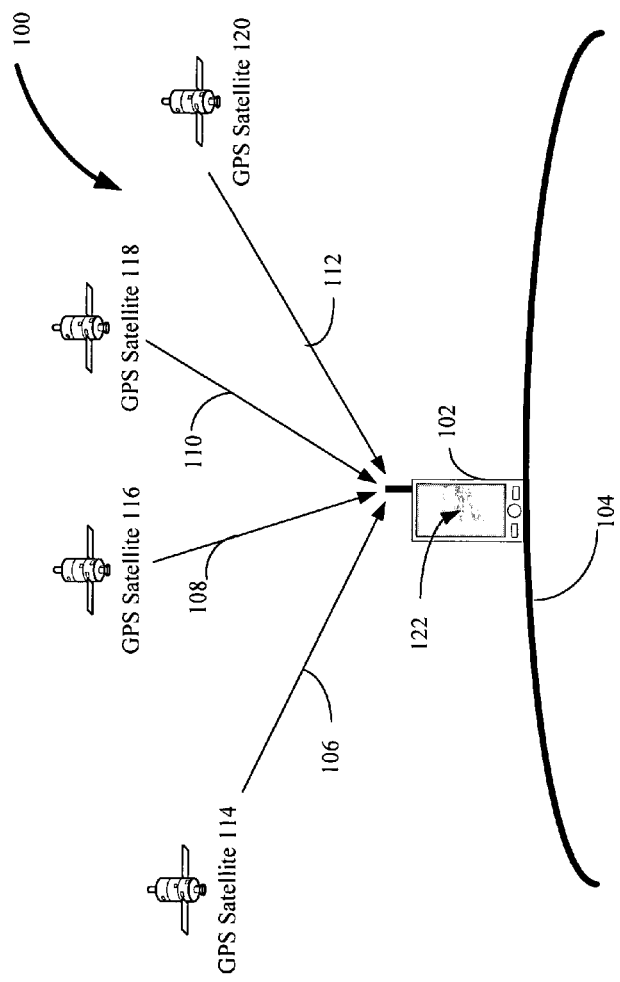
FIG. 1 is an illustration of a typical known GPS receiver in operation.

Turning first to FIG. 1. In FIG. 1, a diagram 100 of an example implementation of a known Global Positioning System ("GPS") is illustrated. In operation, a GPS receiver 102 located on the Earth 104 is designed to pick up signals 106, 108, 110 and 112 from several GPS satellites 114, 116, 118 and 120 simultaneously. The GPS receiver 102 decodes the information and, utilizing the time and ephemeris data, calculates the position of the GPS receiver 102 on the Earth 104. The GPS receiver 102 usually includes a floating-point processor (not shown) that performs the necessary calculations and may output a decimal or graphical display of latitude and longitude as well as altitude on a display 122. Generally, signals 106, 108 and 110 from at least three satellites 114, 116 and 118 are needed for latitude and longitude information. A fourth satellite signal 112 from satellite 120 is needed to compute an altitude.

Figure 2:
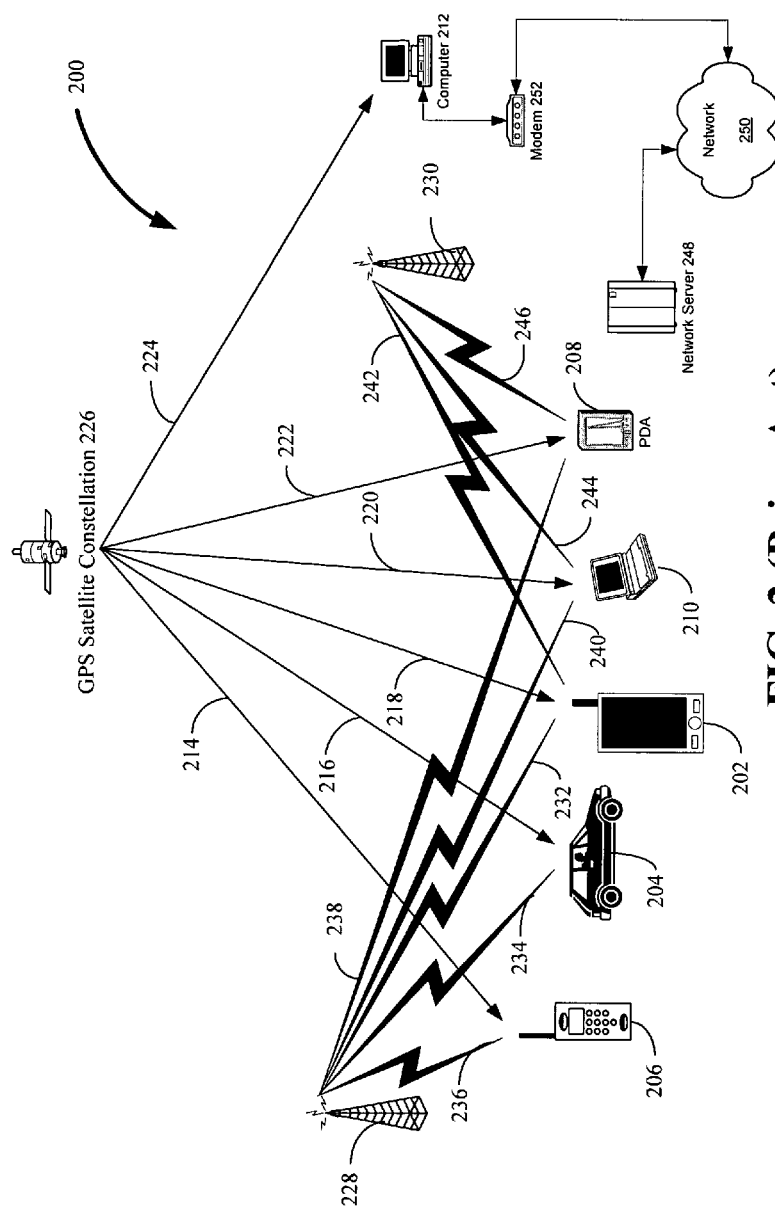
FIG. 2 is an illustration of example known electronic devices with integrated GPS receivers in communication with wireless (both cellular and non-cellular) and non-wireless networks.

FIG. 2 illustrates a diagram 200 of a number of different known applications for GPS. In FIG. 2, numerous example devices 202, 204, 206, 208, 210, and 212 are shown receiving and utilizing GPS signals 214, 216, 218, 220, 222 and 224 from a GPS constellation 226 of satellites (where the individual satellites are not shown). The example devices may include a hand-held GPS receiver 202, an automobile GPS receiver 204, an integrated cellular telephone GPS receiver 206, an integrated personal digital assistant (PDA) GPS receiver 208, an integrated mobile computer (such as a typical "laptop" or "notebook" computer) GPS receiver 210, an integrated computer (non-mobile) GPS receiver 212, or any other similar type of device that may incorporate a GPS receiver.

It is appreciated by those skilled in the art that in the past GPS receivers have typically been stand-alone devices that receive GPS signals from the GPS constellation 226 without any aiding from an external source. However, with Congress' E911 mandate and with the continued growth of wireless communications in both cellular and non-cellular networks, more and more communication devices are beginning to integrate GPS receivers within the communication devices to satisfy the E911 mandate and/or for network-assisted aiding to the GPS receiver.

These new integrated communication devices may either be in communication with a cellular telephone communication network through collection nodes such as a base-station tower 228 or with a non-cellular communication network through non-cellular collection point 230. The cellular communication networks may be a TDMA, CDMA, GSM, W-CDMA, CDMA 2000, UMTS, 3G, GPRS, or AMPS type of cellular network. The non-cellular communication network may include such networks as BlueTooth®, Wireless Fidelity ("Wi-Fi®") network based on IEEE 802.11, or other similar wireless networks. As an example, the hand-held GPS receiver 202, integrated automobile GPS receiver 204, integrated cellular telephone GPS receiver 206, PDA 208, and mobile computer 210 may be in communication with cellular base-station 228 via signal paths 232, 234, 236, 238 and 240, respectively. Similarly, the hand-held GPS receiver 202, PDA 208, and mobile computer 210 may be in signal communication with the non-cellular connection point 230 via signal paths 242, 244 and 246.

As an example of an integrated GPS receiver in a non-wireless communication environment, the non-mobile computer 212 may include an integrated GPS receiver (not shown) that is integrated internally on the motherboard, through an internally added peripheral device, or as a connected external peripheral device. In this example, the integrated GPS receiver (not shown) may receive aiding from a network server 248 via network 250 and modem 252. The network 250 may be the well-known plain old telephone service ("POTS"), an Ethernet, the Internet or other similar network. It is appreciated that other devices connected to POTS, Ethernet and the Internet such as vending machines, office and business equipment, or other important equipment also may be utilized in the same fashion as the non-mobile computer 212.

Figure 3:
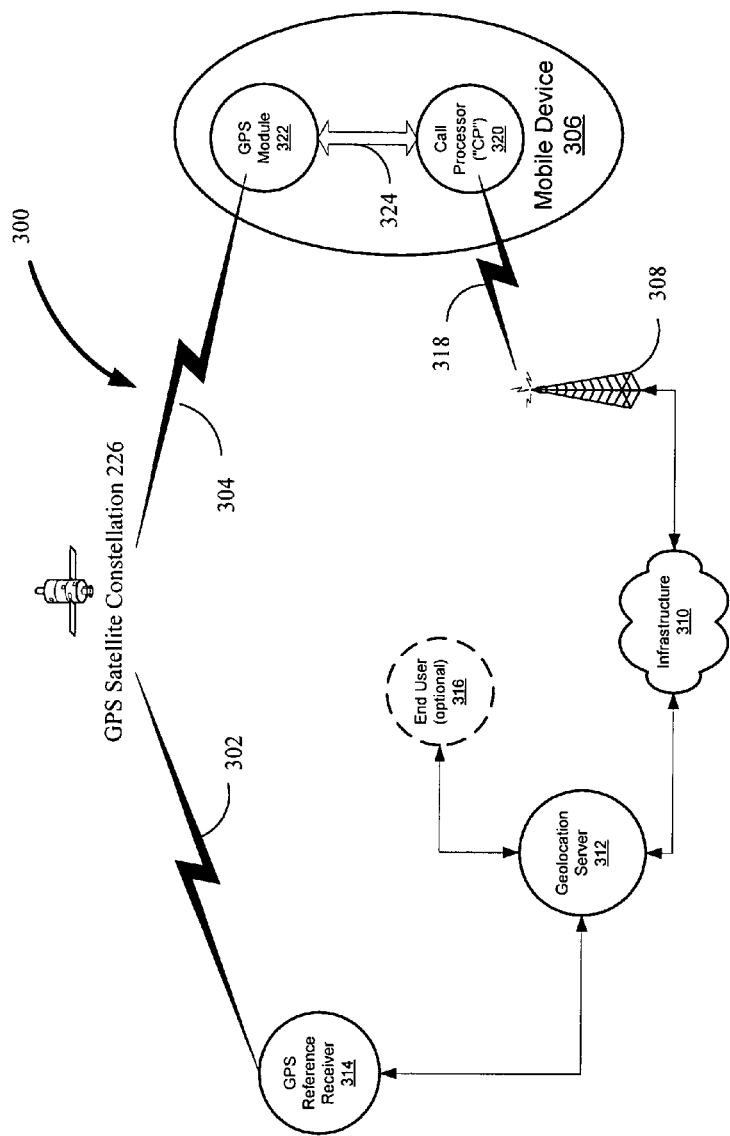
FIG. 3 is a block diagram of a known wireless mobile positioning system architecture that receives GPS data from the GPS constellation.

FIG. 3 shows a known wireless mobile positioning system architecture 300 with network aiding that receives GPS data from the GPS constellation 226 via signal paths 302 and 304. The architecture 300 may include a mobile device 306, base station 308, wireless network infrastructure 310, Geolocation Server Station 312, GPS reference receiver 314 and optional end user 316. The GPS reference receiver 314 receives GPS signals from the GPS constellation 226 via signal path 302. The mobile device 306 receives GPS signals from the GPS constellation 226 via signal path 304 and is in signal communication with base station 308 via signal path 318. Generally, the mobile device 306 includes a call processor 320 and GPS module 322. Both the call processor 320 and GPS module 322 are in signal communication via signal path 324. It is appreciated by those of skill in the art that the call processor 320 and GPS module 322 may be each functional units that may be implemented in either separate semiconductor chips or in one common semiconductor chip or die.

Generally, the architecture 300 shown in FIG. 3 requires that the GPS module 322 utilize the same protocol utilized by the Geolocation Server Station 312 in order to receive any GPS aiding information from the Geolocation Server Station 312.

Figure 4:
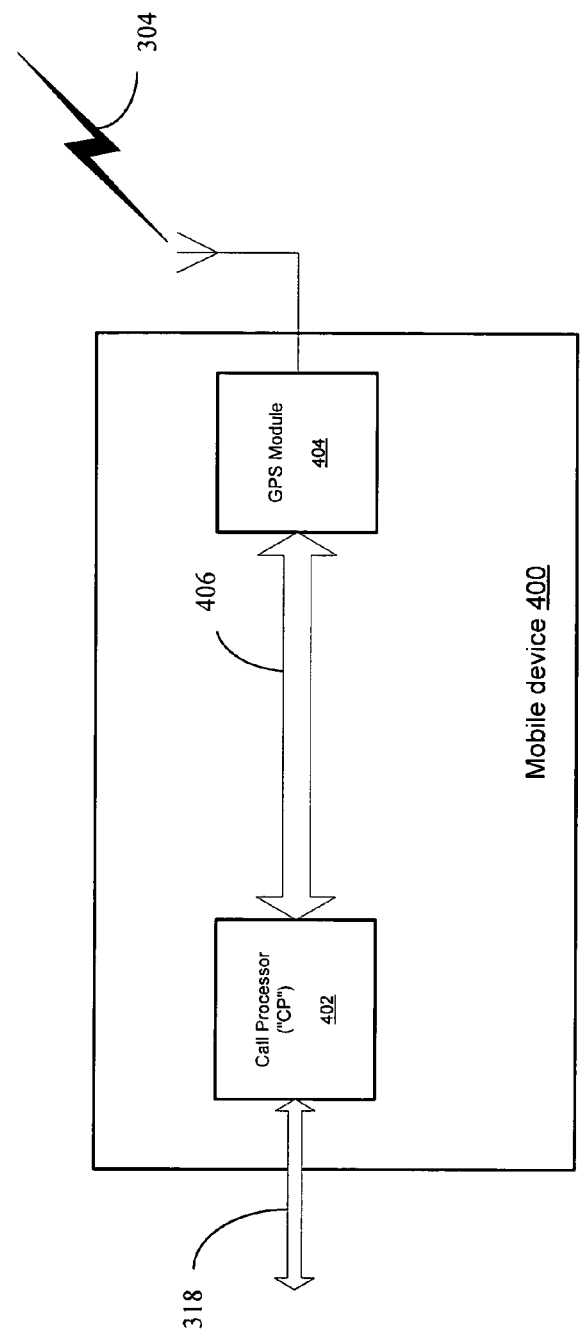
FIG. 4 is a block diagram of an exemplary implementation of the mobile device including a call processor in signal communication with a GPS module.

FIG. 4 shows an example implementation of a mobile device 400 including a call processor 402 in signal communication with a GPS module 404 via signal path 406. The mobile device 400 may be one of the example devices 202, 204, 206, 208, 210, and 212 shown in FIG. 2. The call processor 402 is in signal communication with the base station 308 via signal path 318 and the GPS module 404 receives GPS data from the GPS Satellite Constellation 226 via signal path 304. It is again appreciated that the call processor 402 and GPS module 404 may be each functional units that may be implemented in either separate semiconductor chips or in one common semiconductor chip or die. As an example, the signal path 406 may be implemented with a RS232 data link if the call processor 402 and GPS module 404 are physically separate devices.

In typical operation, the mobile device 400 would receive GPS signals 304 from the GPS constellation 226, FIG. 3, and communication signals 318 from the cellular telephone communication network infrastructure 310 through base-station tower 308 or with the non-cellular communication network (not shown) through non-cellular collection point 230, FIG. 2.

The call processor 402, FIG. 4, may be any communication device capable of communication either one-way or two-way with an external communication network such as the cellular telephone communication network infrastructure 310, FIG. 3, or non-cellular wireless or non-wireless network (not shown). The call processor 402 includes dedicated hardware (not shown) and software (not shown) for establishing and managing a telecommunication connection.

Examples of a cellular telephone type of call processor 402 may include a cellular telephone call processing Integrated Dispatch Enhanced Network ("iDEN™") produced by Motorola, Inc., of Schaumberg, Ill., CDMA2000® 1X type chipsets utilized by Nokia of Finland, Sony Ericsson of Sweden, Qualcomm, Inc. of San Diego, Calif., or any similar type of GSM/CDMA/TDMA/UMTS type of communication device capable of communicating with a GPS receiver within GPS module 308. Examples of a non-cellular telephone type of communication device may include the SX45 GPS accessory produced by Siemens SA of Germany, any communication device capable of communicating with a BlueTooth®, Wireless Fidelity ("Wi-Fi®") network based on IEEE 802.11, or other similar wireless networks. The GPS module 404 may include any GPS receiver capable of communicating with the call processor 402.

Figure 5:
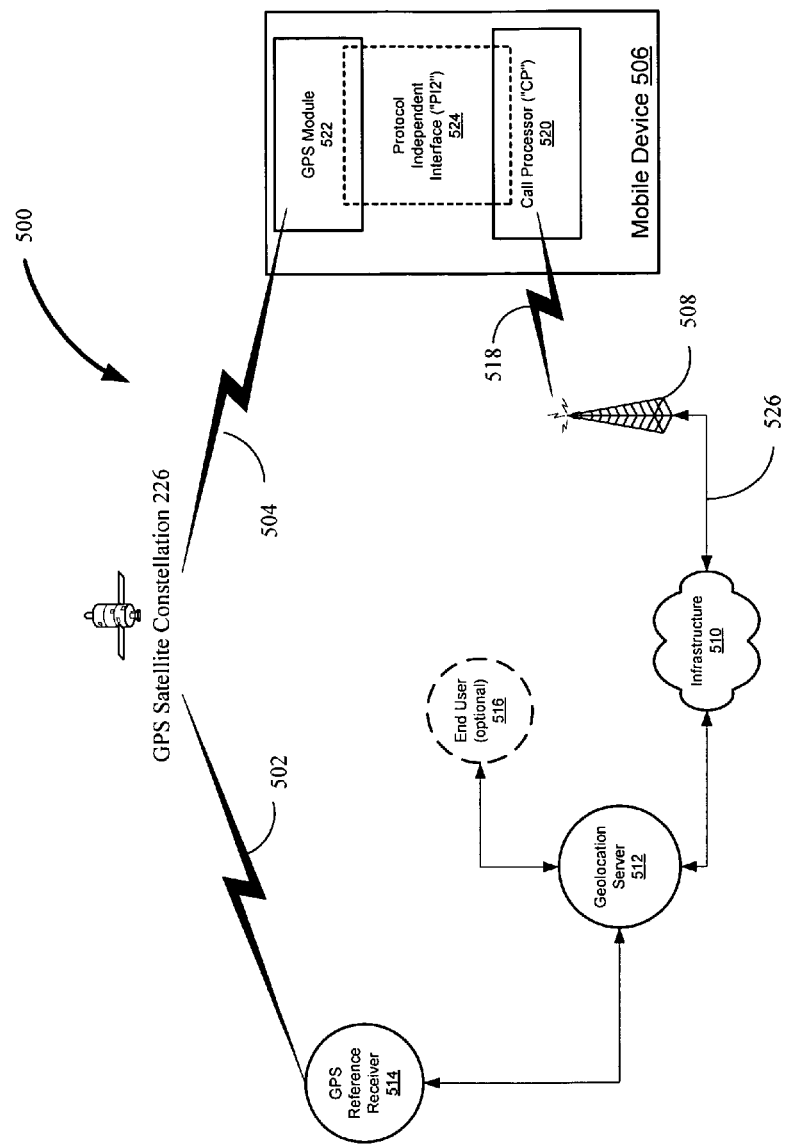
FIG. 5 is a block diagram of an exemplary implementation of a protocol independent interface in a wireless mobile positioning system architecture.

In FIG. 5, an exemplary implementation of a protocol independent wireless mobile positioning system architecture 500 is shown. In FIG. 5, the architecture 500 may include a mobile device 506, base station 508, wireless network infrastructure 510, Geolocation Server Station 512, GPS reference receiver 514, and optional end user 516. The mobile device 506 and GPS reference receiver 514 receive GPS signals from the GPS Satellite Constellation 226 via signal paths 504 and 502, respectively.

The Mobile Device 506 may include a Call Processor 520, GPS module 522 and protocol independent interface (herein known as "PI2") 524. The Call Processor 520 and GPS module 522 may be each functional units that may be implemented in either separate semiconductor chips or in one common semiconductor chip or die. The PI2 524 is an interface that allows the GPS module 522 to receive aiding data from the Geolocation Server Station 512 without requiring the GPS module 522 to utilize the same protocol utilized by the Geolocation Server Station 512. Therefore, the PI2 524 enables the GPS module 522 to be free of specific implementations of multiple protocols for different Geolocation Server Stations. The PI2 524 may be a RS232 link, a logical interface via a memory sharing of software data structures or other types of electrical and/or logical interfaces.

In operation, each Geolocation protocol may be implemented via a translator in the PI2 524 that translates the Geolocation Server Station 512 protocol to an independent protocol used by the GPS module 522. This allows seamless availability of geolocation information as the Mobile Device 506 hands-off from one wireless communication standard to another, thereby changing the way in which the mobile device 506 receives aiding data and transmits position, or other geolocation results, from the Call Processor 520 to the Geolocation Server Station 512. As a result, each unique geolocation protocol (such as IS-817, IS-801 etc.) for all the different air interfaces utilized in the various places around the world may be served by the GPS device 506 without resetting or reconfiguring the GPS module 522 because the PI2 524 is capable of translating the GPS information from the Geolocation Server Station 512 of the communication system subscribed to by the user (not shown) of the Mobile Device 506 into the protocol utilized by the GPS module 522. An example of the PI2 524 may include the aiding independent interoperability interface ("AI3") developed and owned by SiRF Technology, Inc., of San Jose, Calif.

It is appreciated by those skilled in the art that there are different geolocation standards developed for different types of wireless networks. As an example, the interface 526 between the base station 508 and infrastructure 510 may be any air-interface. The interface 526 is typically controlled by the call processor 520 manufacturer. Typically, the PI2 524 includes two interfaces generally known as the "F" interface (not shown) and "G" interface (not shown).

The F interface, which is the client system interface between the GPS module 522 and Call Processor 520, acts as a bootstrap protocol, ever present, allowing the Call Processor 520 to choose at run-time how the aiding will be conveyed to the GPS module 522 in the aiding encapsulation layer. The Call Processor 520 may choose between an air-interface (such as interface 526 in the case of the end-to-end system architecture) or the G interface. The F interface may perform the following tasks: GPS module 522 hardware management from the Call Processor 520 (power on/off, reset); if available, implicit aiding interface, i.e., sends time and frequency transfer from network (or from Call Processor 520 real time clock) via the Call Processor 520, and approximate Mobile Device 506 position (generally implicit from the network, if it does exist); session opening/closing (i.e., notifying the GPS module 522 that an air-interface connection has been opened/closed); and in a dual-mode Mobile Device 506, notifying the GPS module 522 what air interface is on, thus notifying the GPS module 522 what set of geolocation air-interface protocols to use to dialog with the Geolocation Server 512.

Unlike the F interface, the G interface is utilized to convey GPS aiding information received from the base station 508 to the GPS module 522. Since there are typically many existing Geolocation protocols, the G interface may be designed to be usable over a large range of Geolocation standards and air-interface independent, i.e. it is unique for applicable air-interfaces. The PI2 524 may be implemented as a reduction of the applicable Geolocation standards.

In operation, the Call Processor 520 sends position request information and network aiding information in PI2 format to the GPS module 522 through the G interface. In return, the GPS module 522 sends position results or error notification to Call Processor 520 though the same interface. It is appreciated that all Geolocation protocols, including SAMPS, GSM, and CDMA, work under the interaction paradigm. The base station 508 sends back only what the Mobile Device 506 has requested. Generally, the strategy to perform the interaction is highly dependent on the knowledge of the GPS module 522 processing.

Additionally, contrary to many protocol stack levels, Geolocation protocols are application protocols, which means they deal with the semantics (meaning) of the message. They do not, therefore, merely transport data from one side to the other side, without error correction and elimination of swapping or repetition as in a TCP-IP stack. As such, any entity that handles the protocol (e.g., decides to request some data) needs to know what that data will be used for, and the meaning of every parameter exchanged over the protocol (i.e., it needs to know what is happening on the GPS side). As such, the implementer of the Geolocation protocol should be GPS "savvy."

Therefore, the PI2 524 utilizes an air-interface Finite State Machine ("FSM") (not shown). Generally, this results in the state in which the FSM currently resides being imposed by the current knowledge of the contents of the GPS memory (not shown), and in the decision to send a request message to complete some incomplete GPS information being built into the FSM itself.

Figure 6:
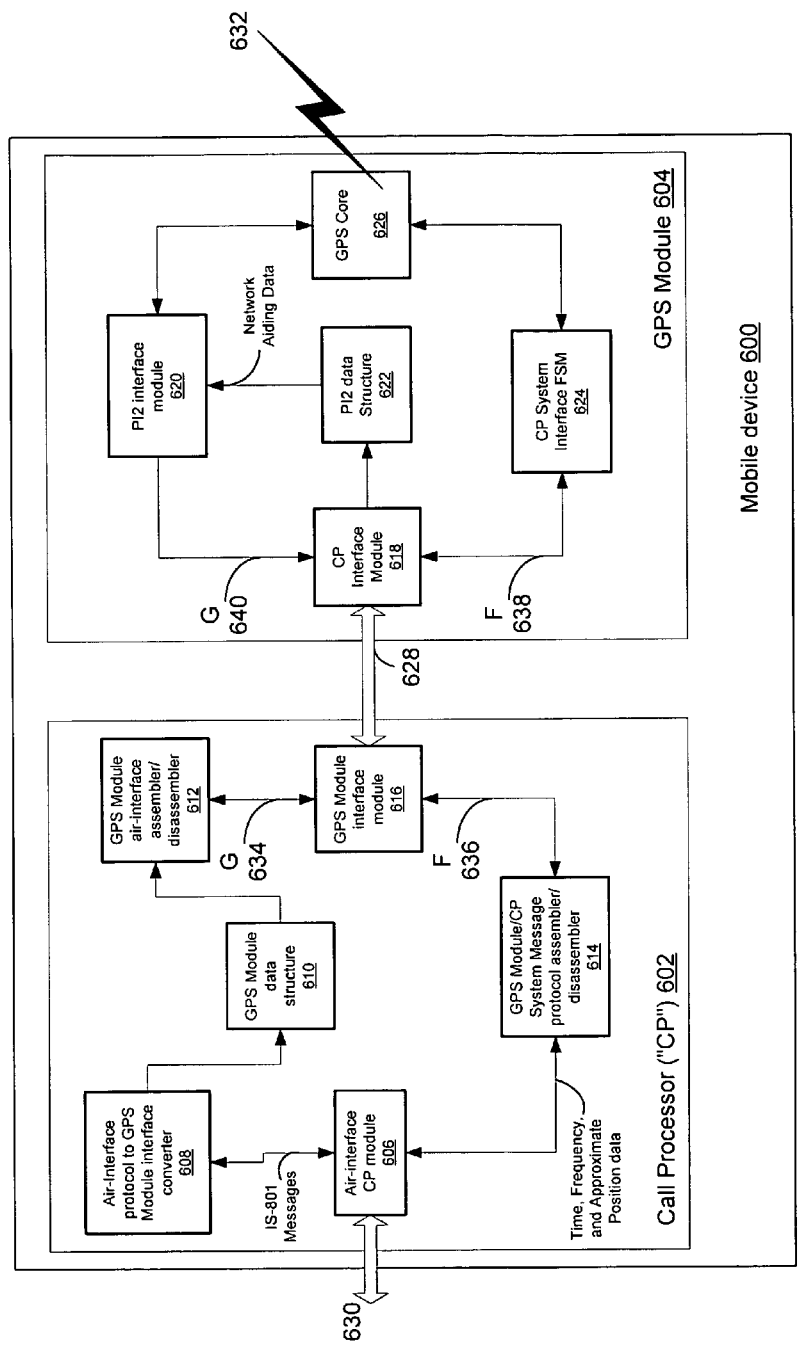
FIG. 6 is a block diagram of an exemplary implementation of a mobile device, according to FIG. 5, utilizing a FSM in a GSM environment.

As such, FIG. 6 shows an exemplary block diagram for IS-801 based CDMA Mobile Device 600 utilizing a FSM. The Mobile Device 600 includes Call Processor 602 and GPS Module 604. Call Processor 602 includes air-interface CP module 606, air-interface protocol to GPS module interface converter 608, GPS module data structure 610, GPS module air-interface assembler/disassembler 612, GPS module/CP System Message protocol assembler/disassembler 614, and GPS Module interface module 616. The GPS Module 604 includes CP interface module 618, PI2 interface module 620, PI2 data structure 622, CP System interface FSM 624, and GPS core 626. The GPS core 626 receives GPS signals from the GPS satellite constellation 226 via signal path 632 and the Air-interface CP module 606 is in signal communication with the base station (not shown) via signal path 630.

Figure 7:
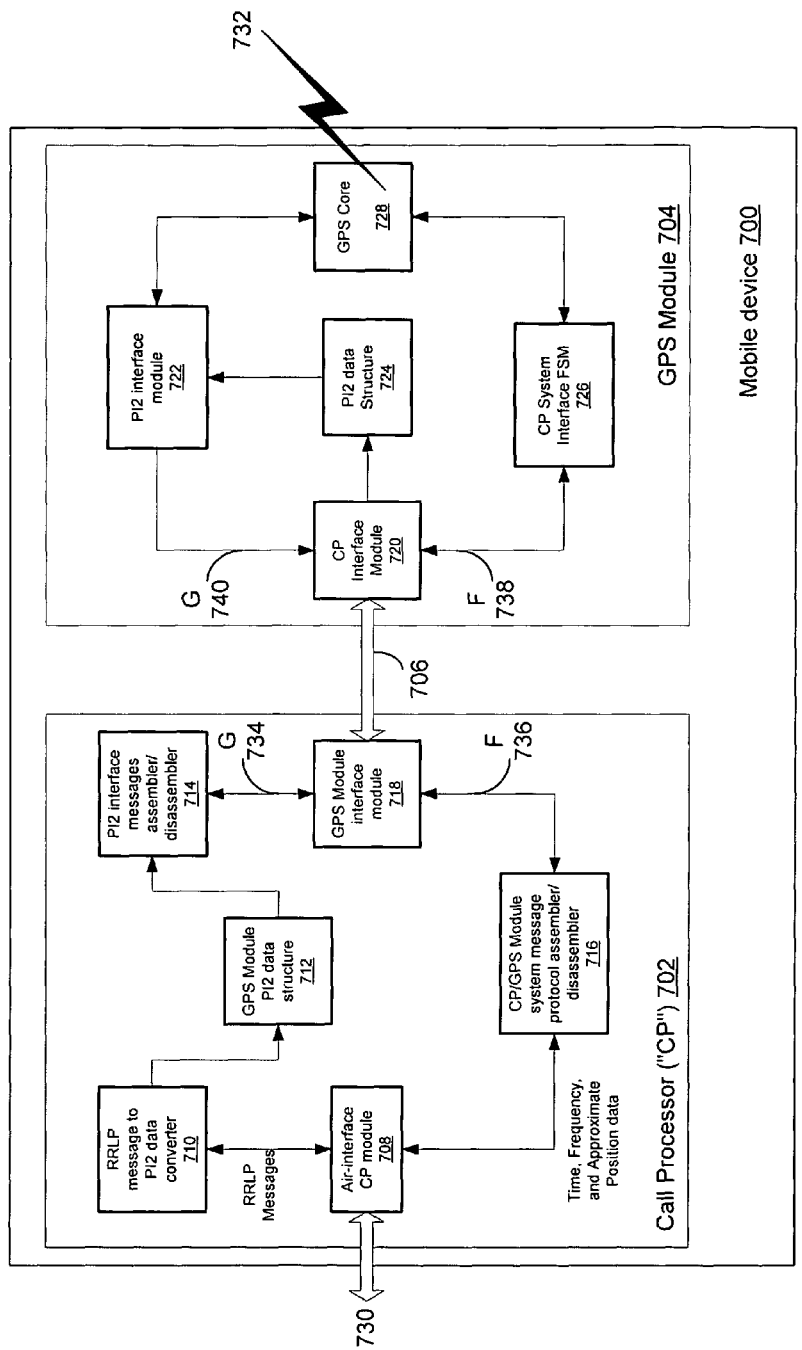
FIG. 7 is a block diagram of an exemplary implementation of a mobile device, according to FIG. 5, utilizing a FSM in a CDMA environment.

Turning to FIG. 7, FIG. 7 shows an exemplary block diagram for RRLP-based handset (i.e., a GSM base cellular telephone) mobile device 700 utilizing a FSM in a CDMA environment. The mobile device 700 includes Call Processor 702 and GPS Module 704 in signal communication via signal path 706. Call Processor 702 includes air-interface CP module 708, air-interface protocol to GPS module interface converter 710, GPS module PI2 data structure 712, PI2 interface messages assembler/disassembler 714, CP/GPS module System Message protocol assembler/disassembler 714, and GPS Module interface module 718. The GPS Module 704 includes CP interface module 720, PI2 interface module 722, PI2 data structure 724, CP System interface FSM 726, and GPS core 728. The GPS core 728 receives GPS signals from the GPS satellite constellation 226 via signal path 732 and the Air-interface CP module 708 is in signal communication with the base station (not shown) via signal path 730.

Figure 8:
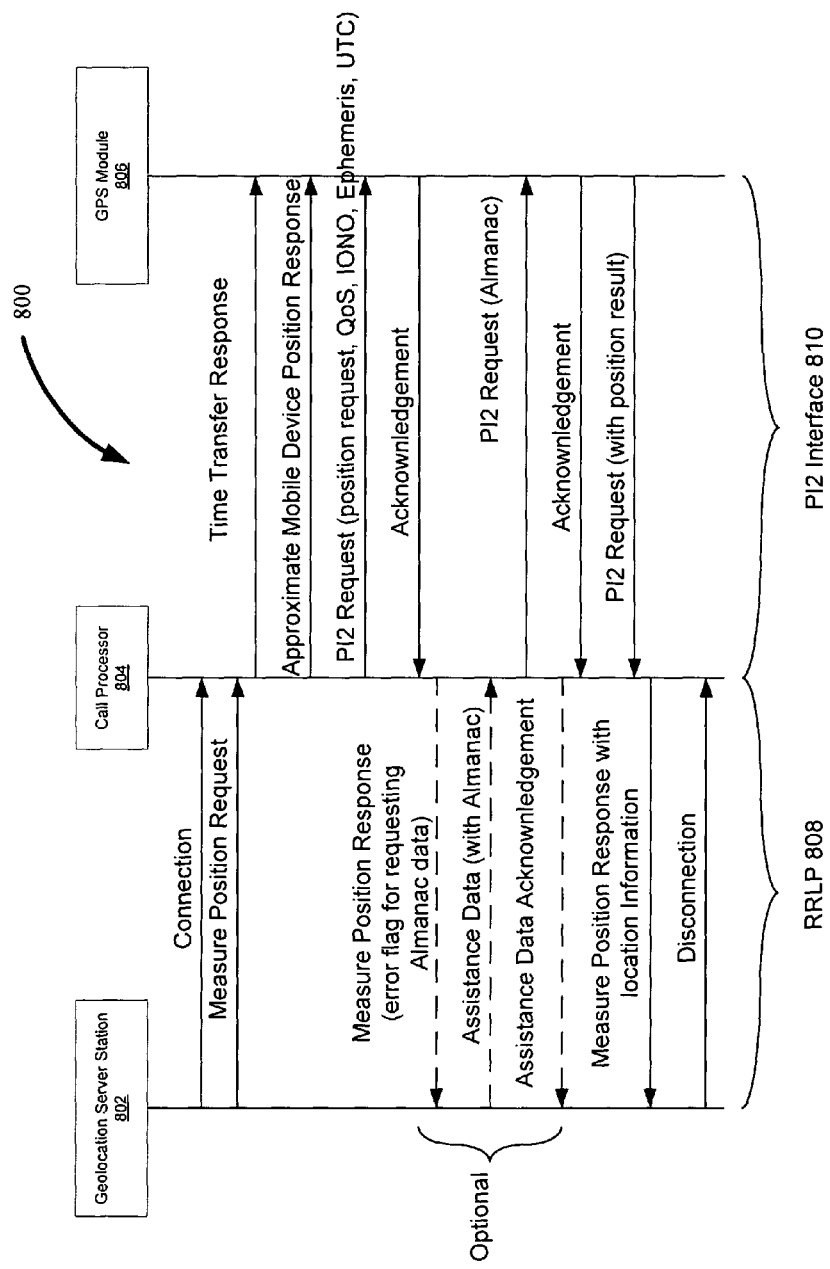
FIG. 8 shows an example of a RRLP to protocol independent interface message flow diagram between a Geolocation Server Station, Call Processor and GPS Module.

FIG. 8 shows an example of a RRLP to PI2 message flow diagram 800 between a Geolocation Server Station 802, Call Processor 804 and GPS Module 806. FIG. 8 graphically shows the process described earlier.

Figure 9:
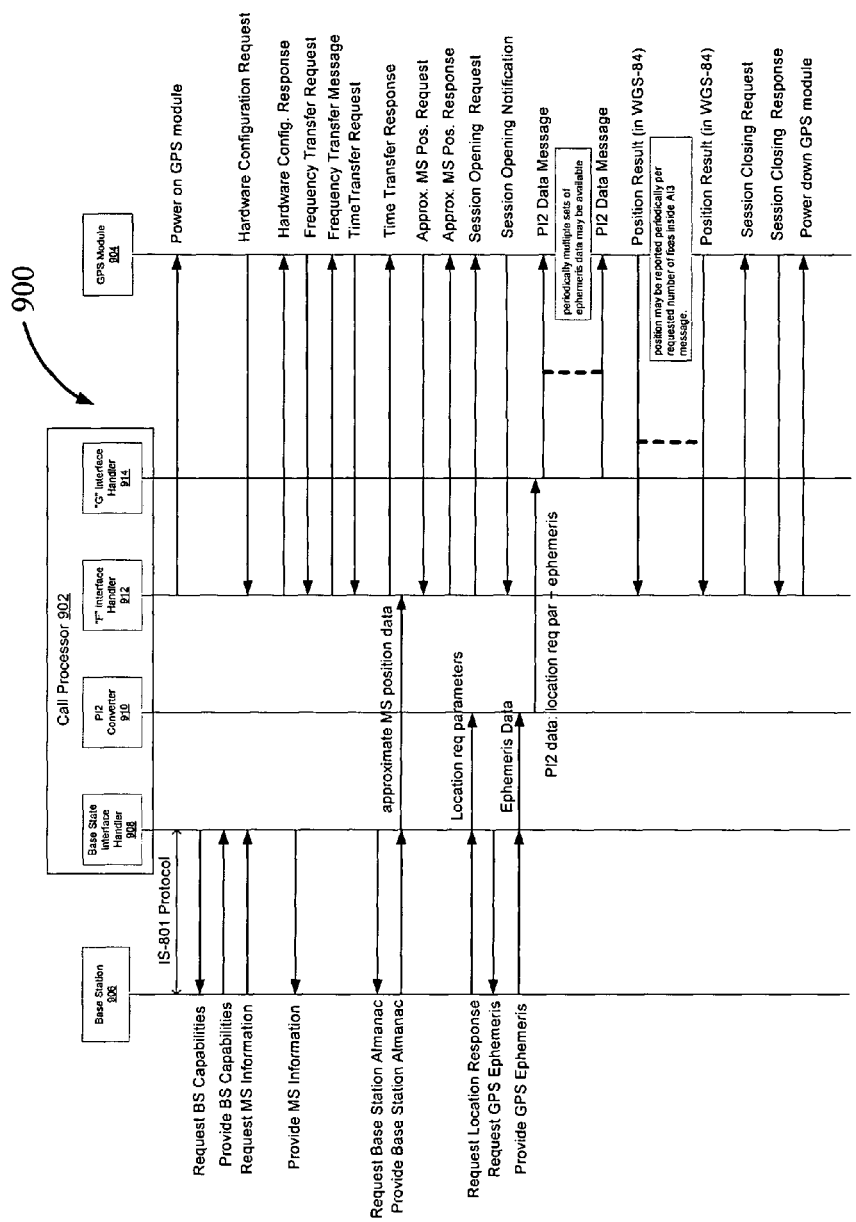
FIG. 9 shows an example of a protocol independent interface message flow diagram between a call processor, GPS Module and a base station ("BS").

FIG. 9 shows an example of PI2 message flow diagram 900 between a call processor 902, GPS Module 904 and a base station ("BS") 906. The call processor 902 includes a base station interface handler 908, PI2 converter 910, F interface handler 912 and G interface handler 914. FIG. 9 shows graphically shows the process described earlier.

Figure 10:
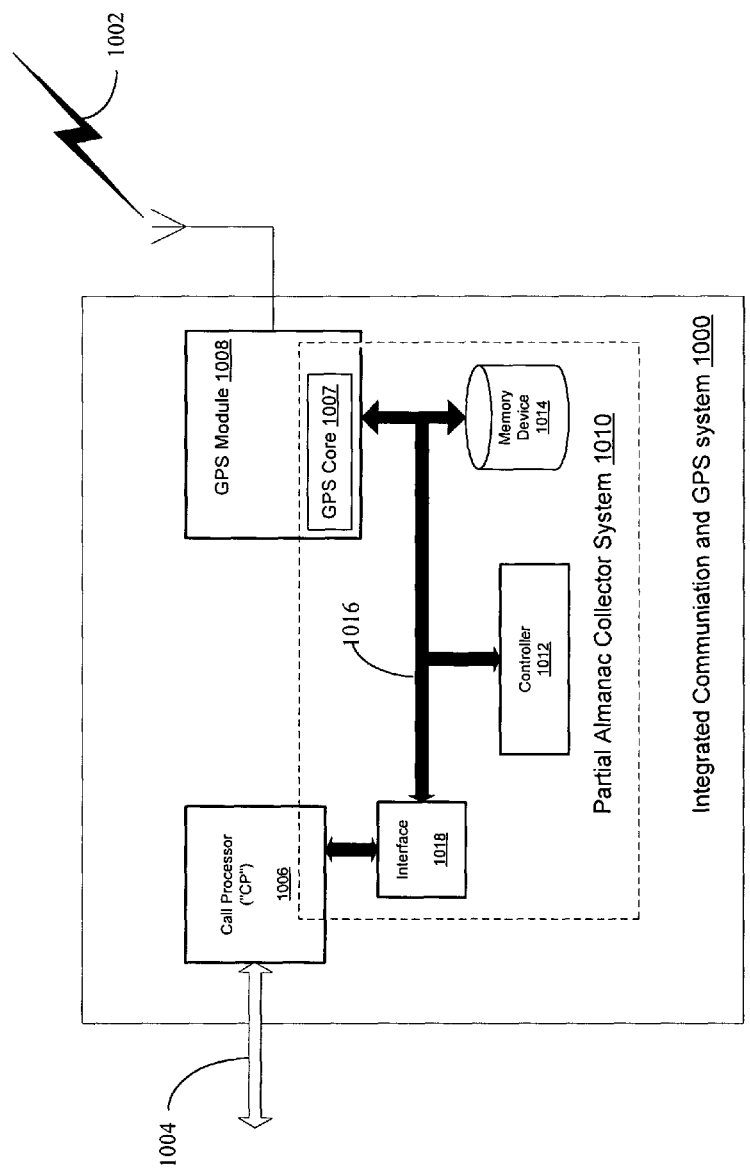
FIG. 10 is a block diagram of an example implementation of a partial almanac collection system ("PACS") in signal communication with the GPS constellation and networks shown in FIG. 2.

FIG. 10 shows an example implementation of integrated communication and GPS system 1000 similar to any of the example devices 202, 204, 206, 208, 210, and 212 shown in FIG. 2. The integrated communication and GPS system 1000, FIG. 10, would receive GPS signals 1002 from the GPS constellation 226, FIG. 2, and communication signals 1004, FIG. 10, from the cellular telephone communication network (not shown) through base-station tower 228, FIG. 2, or with the non-cellular communication network (not shown) through non-cellular collection point 230. The integrated communication and GPS system 1000 may include a communication module 1006 (such as a Call Processor "CP"), a GPS core 1007 within a GPS module 1008 in signal communication with the Call Processor 1006, and a Partial Almanac Collection System ("PACS") 1010.

The Call Processor 1006 may be any communication device capable of communication either one-way or two-way with an external communication network such as the cellular telephone communication network (not shown) or non-cellular wireless or non-wireless network (not shown). Examples of a cellular telephone type of communication module 1006 may include a cellular telephone call processing Integrated Dispatch Enhanced Network ("iDEN™") produced by Motorola, Inc., of Schaumberg, Ill., CDMA2000® 1X type chipsets utilized by Nokia of Finland, Sony Ericsson of Sweden, Qualcomm, Inc. of San Diego, Calif. or any similar type of GSM/CDMA/TDMA/UMTS type of communication device capable of communicating with the GPS module 1008. Examples of a non-cellular telephone type of communication device may include a SX45 GPS accessory produced by Siemens SA of Germany, any communication device capable of communicating to a BlueTooth™, Wireless Fidelity ("Wi-Fi®") network based on IEEE 802.11, or other similar wireless networks. The GPS module 1008 may include any GPS receiver capable of communicating with the communication module 1006. The GPS core 1007 is a typical GPS functional block within a GPS receiver that receives GPS signals from the GPS satellite constellation 226 and extracts GPS data from the received GPS signals.

The PACS 1010 may include a controller 1012, memory device 1014 such as non-volatile memory and/or storage device to store data, an interface 1018 (such as the above mentioned PI2 interface), and a PACS communication bus 1016 in signal communication with the controller 1012, storage device 1014, interface 1018, Call Processor 1006 and GPS module 1008. The PACS 1010 may be integrated (such as being integrated on the same integrated circuit semiconductor die) in either the Call Processor 1006 or the GPS module 1008, or may be a separate external device within the integrated communication and GPS system 1000. The PACS 1010 also may be a separate external device external to the integrated communication and GPS system 1000 such as an external add-on card or device. Additionally, the PACS 1010 may be integrated on a single integrated circuit semiconductor die that includes the Call Processor 1006, GPS module 1008 and PACS 1010.

The controller 1012 may be any processor type of controller including the processor (not shown) of the Call Processor 1006, the processor (not shown) of the GPS module 1008, or an external processor that is capable of controlling how the almanac data is gathered by GPS module 1008 and how the gathered data is passed to the Call Processor 1006. The controller 1012 may be a microprocessor, digital signal processor ("DSP"), or application specific integrated circuit ("ASIC"). In the case of a microprocessor or DSP, software (not shown) may be utilized to control the operations of the controller 1012. This software may be resident in the controller 1012, the Call Processor 1006, GPS module 1008 or in a removable memory (not shown) such as an removable memory disk (such as a floppy, CDROM, DVD or other similar type medium) or card (such as a MemoryStick™, CompactFlash™, xD™, SmartMedia™ or other similar medium).

As an example of operation, the PACS 1010 allows the GPS module 1008 to receive a partial (i.e., piecewise or piece-meal) almanac from the GPS constellation 226. In this way, the integrated communication and GPS system 1000 does not have to wait a significant amount of time with continuous uninterrupted satellite visibility for the GPS module 1008 to download an entire full almanac of almanac data.

The PACS 1010 allows the GPS module 1008 to receive the almanac data and provide to the PACS 1010 the information for each individual satellite as it becomes available. The PACS 1010 is capable of receiving information such as the almanac week and time-of-arrival ("TOA") from the GPS module 1008, and associating the almanac week and TOA with each satellite datum that is provided by the GPS module 1008. The PACS 1010 then assembles the satellite information received from the GPS module 1008 and keeps track of the freshness of each satellite in the almanac. As a result, the PACS 1010 is capable of working with an almanac that may have a mixture of satellites with differing almanac week and TOA information.

In general, the PACS 1010 controller 1012 is capable of initiating and ending an almanac download session with the GPS module 1008 via PACS communication bus 1016. The PACS 1010 controller 1012 is also capable of determining whether it has received sufficient satellite information from the GPS module 1008 to keep track of the status of each satellite in the almanac. The controller 1012 then stores the almanac in PACS 1010 non-volatile memory 1014, via PACS communication bus 1016, for future use. The PACS 1010 is able to pass the almanac data to the Call Processor 1006 and/or GPS module 1008 via PACS communication bus 1016.

In general, the PACS 1010 may operate in two ways. The first way may be described as a polling process (i.e., method) where the PACS 1010 requests a piecewise almanac download from the GPS module 1008 possibly in response to receiving a request for a piecewise download from the Call Processor 1006 if the PACS 1010 is a separate device from the Call Processor 1006. The PACS 1010 continues to make periodic requests to the GPS module 1008 to gather the almanac status until either it is received completely (as indicated by a full almanac received flag) or the PACS 1010 decides to close the session with the GPS module 1008 before a full download of the almanac data is completed. The PACS 1010 may close the session with GPS module 1008 before a full download of the almanac data for a number of different reasons including powering down (i.e., when a user turns off the integrated communication and GPS device 1000), power saving considerations, having already received a full almanac for the Call Processor 1006, or because the Call Processor 1006 requested the session closed to place a call or perform another function that conflicts with an open session with the GPS module 1010.

The second way may be described as a non-polling method where the PACS 1010 again makes a request to the GPS module 1008 for a piecewise almanac download again possibly in response to receiving a request from the Call Processor 1006. However, in this case, the controller 1012 makes a determination on how the GPS module 1008 will respond to the request from the Call Processor 1006. If the GPS module 1008 received enough time to complete the collection of a full almanac, the PACS 1010 responds to the Call Processor 1006 that a full almanac is downloaded as saved in memory 1014. If the PACS 1010 determines for any reason to perform a session close with the GPS module 1008 before the GPS module 1008 was able to download a full almanac, the PACS 1010 responds to the Call Processor 1006 that a partial almanac has been downloaded. If the environmental conditions change while the GPS module 1008 is collecting the almanac data and the GPS module is only capable of downloading a partial almanac, the PACS 1010 responds to the Call Processor 1006 that a partial almanac has been downloaded. Additionally, if PACS 1010 determines that the GPS module 1008 cannot collect any almanac information within a time limit given by the Call Processor 1006, the PACS 1010 responds to the Call Processor 1006 that no almanac data could be collected.

Figure 11:
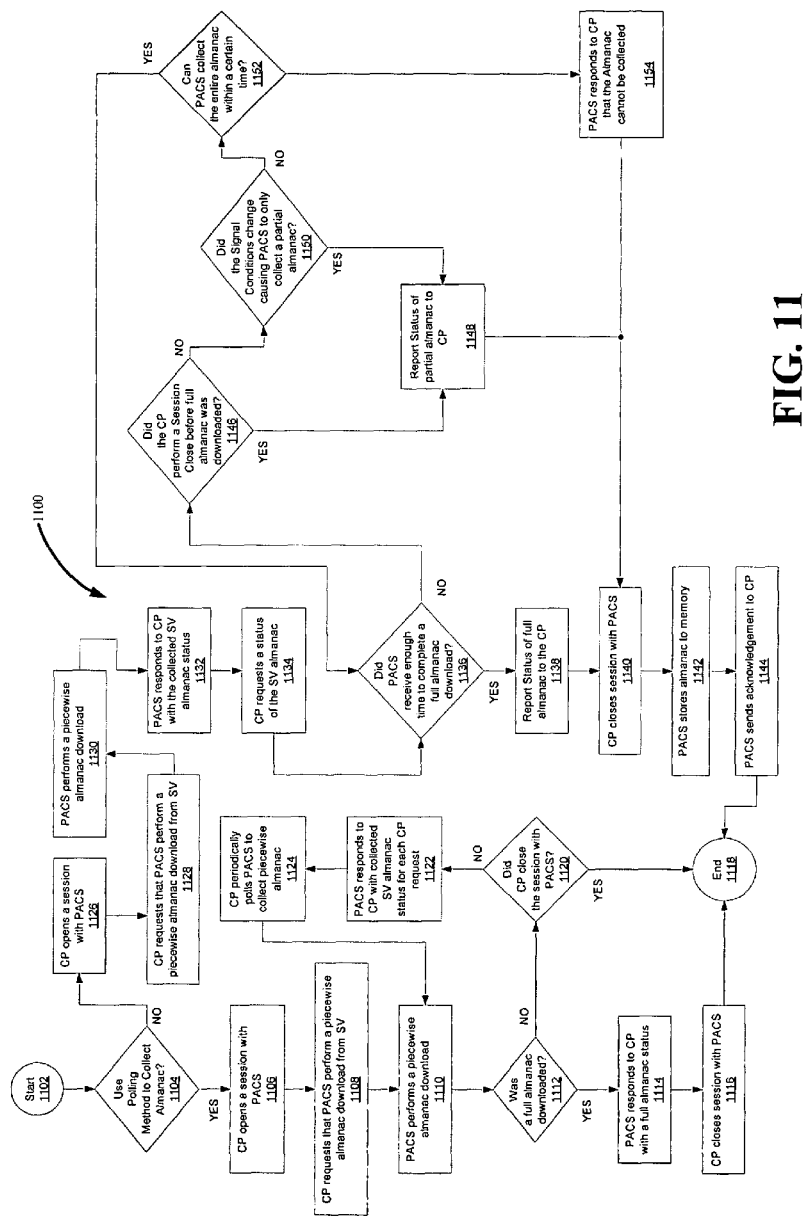
FIG. 11 shows a flow diagram of an example process performed by the PACS shown in FIG. 10.

Turning now to FIG. 11 which shows a flow diagram 1100 illustrating an example method of operation of the PACS in both a polling and non-polling process. In an exemplary polling process, the process starts in step 1102 and continues through decision step 1104 to step 1106. In step 1106, the Call Processor opens a session with the PACS and then, in step 1108, the Call Processor requests that the PACS perform a piecewise almanac download from a satellite (also known as a "space vehicle" or "SV"). In response, the PACS performs a piecewise almanac download in step 1110. The Call Processor then polls the PACS to see if a full almanac was downloaded. In decision step 1112, if a full almanac was downloaded, the process continues to step 1114 and the PACS responds to the Call Processor with a status of full almanac. The Call Processor then closes the session with the PACS in step 1116 and the process ends 1118.

If, instead, the full almanac was not downloaded, the process continues from decision step 1112 to decision step 1120. In decision step 1120, if the Call Processor closed the session with the PACS, the process ends 1118.

If, however, the Call Processor did not close the session with the PACS, the process continues from decision step 1120 to step 1122. In step 1122, the PACS responds to the Call Processor with the status of collected satellite almanac for the Call Processor's poll request. The process then continues to step 1124, and the Call Processor periodically polls the PACS to collect the piecewise almanac. The PACS responds by performing a piecewise almanac download for each poll in step 1110 and the process repeats steps 1112, 1120, 1122, 1124, and 1110 until either a full almanac is downloaded or the Call Processor closes the session, in which case, the process ends via steps 1114, 1116 and 1118 or 1120 and 1118.

In an exemplary non-polling process, the process again starts in step 1102 and continues through decision step 1104 to step 1126. In step 1126, the Call Processor opens a session with the PACS and in step 1128 the Call Processor requests that the PACS perform a piecewise almanac download from a satellite. The PACS performs a piecewise almanac download, in step 1130, and responds to the Call Processor, in step 1132, with the status of the collected almanac. In step 1134, the Call Processor requests a status of the almanac and, in decision step 1136, the PACS determines if the PACS received enough time to complete a full almanac download. It is appreciated that the Call Processor may also make the same determination.

If the PACS did receive enough time to complete a full almanac download, the process continues from decision step 1136 to step 1138. In step 1138, the PACS reports a status of full almanac to the Call Processor, which in response the Call Processor closes the session with PACS in step 1140. The PACS then stores the almanac data to memory (i.e., a storage device), in step 1142, and then sends an acknowledgment to the Call Processor in step 1144. The process then ends 1118.

If the PACS did not receive enough time to complete a full almanac download, the process continues from decision step 1136 to decision step 1146. In decision step 1146, if the Call Processor performed a Session Close operation before the PACS downloaded a full almanac, the process continues to step 1148. In step 1148, the PACS reports a status of partial almanac download to the Call Processor, which in response the Call Processor closes the session with PACS in step 1140. The PACS then stores the almanac data to memory (i.e., a storage device), in step 1142, and then sends an acknowledgment to the Call Processor in step 1144. The process then ends 1118.

If, instead, the Call Processor did not perform a Session Close operation before the PACS downloaded a full almanac, the process continues from decision step 1146 to decision step 1150. In decision step 1150, if the Call Processor and/or the PACS determines that the signal conditions have changed in a way that causes the PACS to only collect a partial almanac, the PACS reports a status of partial almanac to the Call Processor in step 1148. In response, the Call Processor closes the session with PACS in step 1140. The PACS then stores the almanac data to memory (i.e., a storage device), in step 1142, and then sends an acknowledgment to the Call Processor in step 1144. The process then ends 1118.

Alternatively, if the Call Processor and/or the PACS determines that the signal conditions have not changed in a way that causes the PACS to only collect a partial almanac, the process continues to decision step 1152. In decision step 1152, if the Call Processor and/or the PACS determines that the PACS cannot collect the entire almanac within a certain time determined by either the Call Processor and/or the PACS, the process continues to step 1154. In step 1154, the PACS responds to Call Processor with a status that indicates that the almanac cannot be collected. In response, the Call Processor closes the session with PACS in step 1140. The PACS then stores the almanac data to memory (i.e., a storage device), in step 1142, and then sends an acknowledgment to the Call Processor in step 1144. The process then ends 1118.

Figure 12:
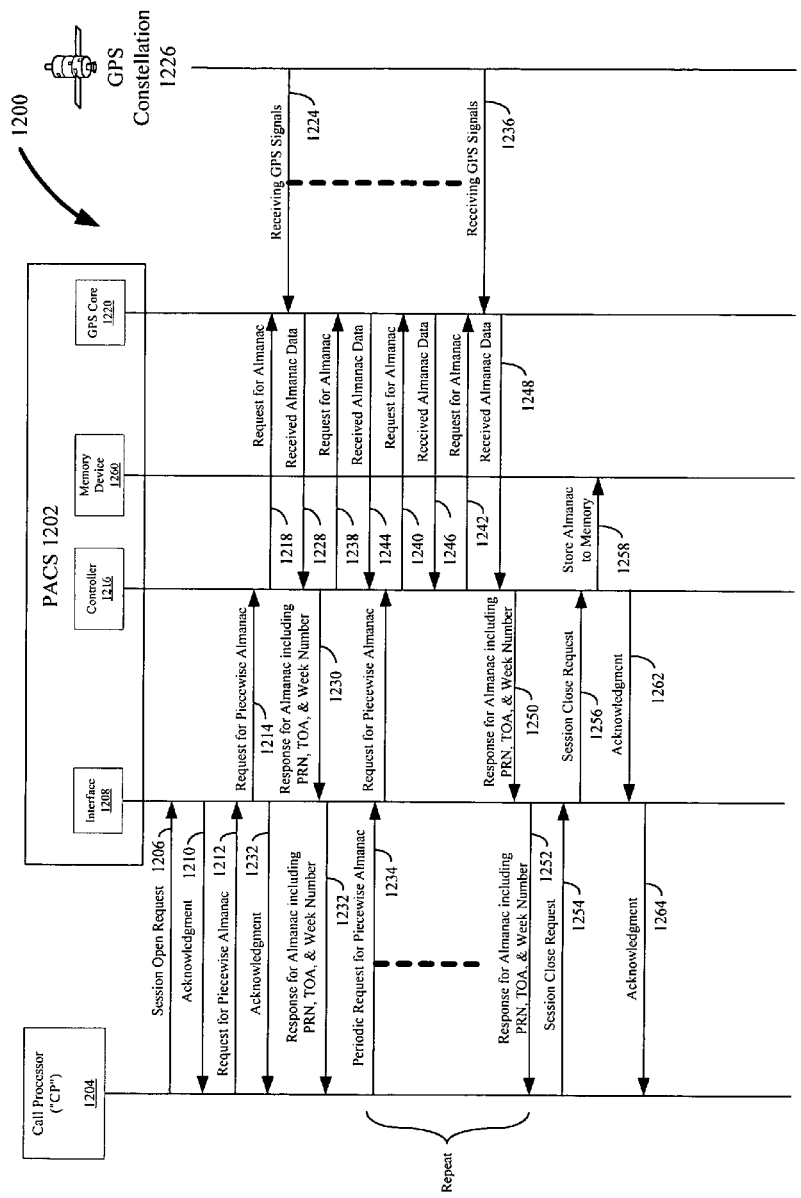
FIG. 12 shows a signal flow diagram for example polling process performed by the PACS shown in FIG. 10.

FIG. 12 shows a signal flow diagram 1200 for the exemplary polling process performed by the PACS 1202. In this exemplary process, the Call Processor 1204 makes a request for a piecewise almanac download to the PACS 1202. The Call Processor 1204 may take on the burden of making periodic requests to the PACS 1202 to gather the almanac status until either the Call Processor 1204 receives the status of a full almanac download or the Call Processor 1204 decides to close the session before a full almanac is complete. In general, the process may include the Call Processor 1204 opening a session with the PACS 1202 (possible through the PI2 interface), making a request to the PACS 1202 for collecting a piecewise satellite ("SV") almanac download, periodically polling the PACS 1202 to collect the piecewise almanac, having the PACS 1202 respond with a collected SV almanac status for each polling request, and on completion of the complete download, having the Call Processor 1204 close the session with the PACS 1202. The PACS 1202 then stores the almanac data to the memory device 1260 (such as Flash) before the session is closed between the PACS 1202 and Call Processor 1204. The PACS 1202 may receive instructions from the Call Processor 1204 that include parameters of operations such as, but not limited to, instructions to collect satellite almanac when signal conditions are above a certain level (such as greater than 28 dB-Hertz) and indications of the whether the Call Processor 1204 will, or will not, not provide any almanac aiding.

As shown in FIG. 12, the Call Processor 1204 sends a Session Open request 1206 to the PACS 1202 via Interface 1208 (such as the PI2 interface). The PACS 1202 sends an acknowledgment 1210 of the Session Open request 1206. The Call Processor 1204 then sends a request for piecewise almanac 1212 to the PACS 1202. The PACS 1202 then passes the piecewise almanac request 1214 from the Interface 1208 to the controller 1216, which passes the request 1218 to the GPS core 1220 within the GPS module (not shown) and sends an acknowledgment 1222 to the Call Processor 1204.

The GPS core 1220 then receives the GPS signals 1224 from the GPS constellation 1226. The GPS core 1220 extracts the received almanac data from the received GPS signals 1224 and passes the received almanac data 1228 to the Controller 1216. The Controller 1216 then determines the pseudorandom noise number ("PRN"), time-of-arrive ("TOA"), and Week number from the almanac data and passes, via 1230 and 1232, the almanac data, including the PRN, TOA and Week number, from the PACS 1202 to Call Processor 1204. In response, the Call Processor 1204 makes periodic requests for piecewise almanac 1234 via requests for almanac update status requests. It is appreciated that the GPS core 1220 is constantly receiving GPS signals 1224 and 1236 from the GPS constellation 1226, and that the Controller 1216 is periodically requesting 1238, 1240, and 1242 and receiving 1244, 1246 and 1248 almanac data from the GPS core 1220.

The Controller 1216 responds to the periodic requests for piecewise almanac from the Call Processor 1204, with piecewise almanac data 1250 that is passed 1252 from the PACS 1202 to the Call Processor 1204. The Controller 1216 then manages the almanac database and applies any mixed almanac processing. At some point, the Call Processor 1204 sends a Session Close Request 1254 to the PACS 1202, in response to either a received status from the PACS 1202 of full almanac collected or a status indicating that the PACS cannot collect the almanac. When the Call Processor 1204 sends a Session Close request 1254 to the PACS 1202, the Session Close request 1256 is passed to the Controller 1216. The Controller 1216 then passes 1258 the almanac data to storage memory 1260. The Controller then responds, via 1262 and 1264, to the Call Processor 1204 with an acknowledgment.

Alternatively, in a non-polling exemplary process, the Call Processor makes a request for an almanac download (such as a piecewise almanac download) to the PACS. The PACS than makes a determination on the reporting of the status of the almanac download based on the following scenarios: 1) PACS will report a status of full almanac download, if the PACS received enough time to complete the collection of the full almanac; 2) PACS will report a status of partial almanac download in the case that the Call Processor performs Session Close, for any reason, before a full almanac download was completed by the PACS; 3) PACS will report a status of partial almanac download in the case when the signal condition changes while the PACS is collecting the almanac and was able to collect only a partial almanac; and 4) PACS will report a status to the Call Processor that the almanac could not be collected because the PACS could not collect the almanac (typically in weak signal conditions) within a certain predetermined time such as, for example, 5 minutes. The PACS then stores the almanac data to the memory device (such as Flash) before the session is closed between and the Call Processor and sends an acknowledgment to the Call Processor.

Figure 13:
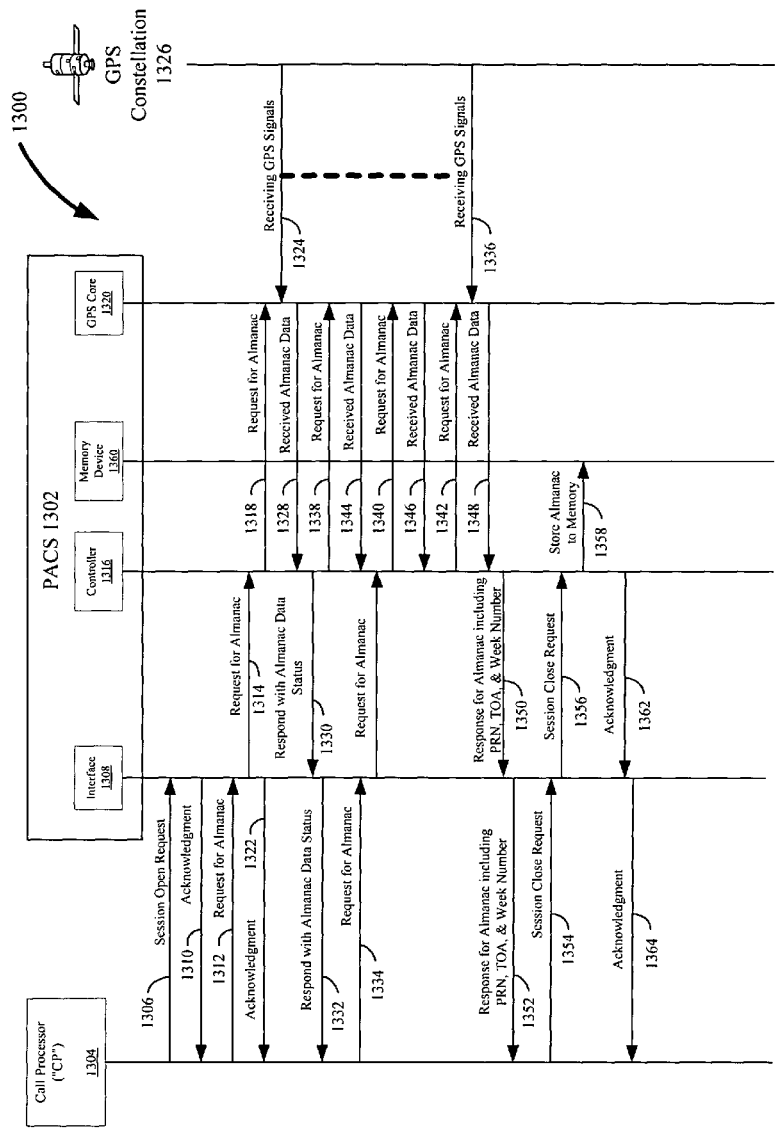
FIG. 13 shows a signal flow diagram for example non-polling process performed by the PACS shown in FIG. 10.

As an example, FIG. 13 shows a signal flow diagram 1300 for exemplary non-polling process performed by the PACS 1302. In this exemplary process, the Call Processor 1304 initiates a session with the PACS 1302 and requests an almanac download (such as a piecewise almanac download) to the PACS 1302. The PACS 1302 may receive instructions from the Call Processor 1304 that include parameters of operations such as, but not limited to, instructions to collect satellite almanac when signal conditions are above a certain level (such as greater than 28 dB-Hertz) and indications of the whether the Call Processor 1304 will, or will not, provide any almanac aiding. The PACS 1302 then responds with an acknowledgment to the Call Processor's 1304 request, starts almanac collection, and responds to the Call Processor 1304 with almanac status messages. The Call Processor 1304 then requests almanac update status from the PACS 1302 via message requests. The PACS 1302 responds to the Call Processor 1304 requests with almanac status messages for the almanac data collected for all the satellites that include almanac PRN, TOA, and Almanac Week number. The PACS 1302 then manages the almanac database and applies any mixed almanac processing. At some point, the Call Processor 1304 closes the session with the PACS 1302 by sending a Close Session Request. The PACS 1302 then stores the almanac to a memory device 1360 (such as Flash) and sends an acknowledgment to the Call Processor 1304.

As shown in FIG. 13, the Call Processor 1304 sends an Session Open request 1306 to the PACS 1302 via Interface 1308 (such as the PI2 interface). The PACS 1302 sends an acknowledgment 1310 to the Session Open request 1306. The Call Processor 1304 then sends a request for almanac 1312 to the PACS 1302. The PACS 1302 then passes the almanac request 1314 from the Interface 1308 to the Controller 1316, which passes the request 1318 to the GPS core 1320 within the GPS module (not shown) and sends an acknowledgment 1322 to the Call Processor 1304.

The GPS core 1320 then receives the GPS signals 1324 from the GPS constellation 1326. The GPS core 1320 extracts the received almanac data from the received GPS signals 1324 and passes the received almanac data 1328 to the Controller 1316. The Controller 1316 then determines the status of the almanac download and passes the almanac data status, via 1330 and 1332, from the PACS 1302 to Call Processor 1304. In response, the Call Processor 1304 makes a request for almanac 1334. It is appreciated that the GPS core 1320 is constantly receiving GPS signals 1324 and 1336 from the GPS constellation 1326, and that the Controller 1316 is periodically requesting 1338, 1340, and 1342 and receiving 1344, 1346 and 1348 almanac data from the GPS core 1320.

The Controller 1316 responds to the almanac request 1334 from the Call Processor 1304, with piecewise almanac data 1350 that is passed 1352 from the PACS 1302 to the Call Processor 1304. The Controller 1316 then manages the almanac database and applies any mixed almanac processing. At some point, the Call Processor 1304 sends a Session Close Request 1354 to the PACS 1302, in response to either a received status from the PACS 1202 of full almanac collected or a status indicating that the PACS cannot collect the almanac. When the Call Processor 1304 sends a Session Close request 1354 to the PACS 1302, the Session Close request 1356 is passed to the Controller 1316. The Controller 1316 then passes 1358 the almanac data to storage memory 1360. The Controller 1316 then responds, via 1362 and 1364, to the Call Processor 1302 with an acknowledgment.

Figure 14:
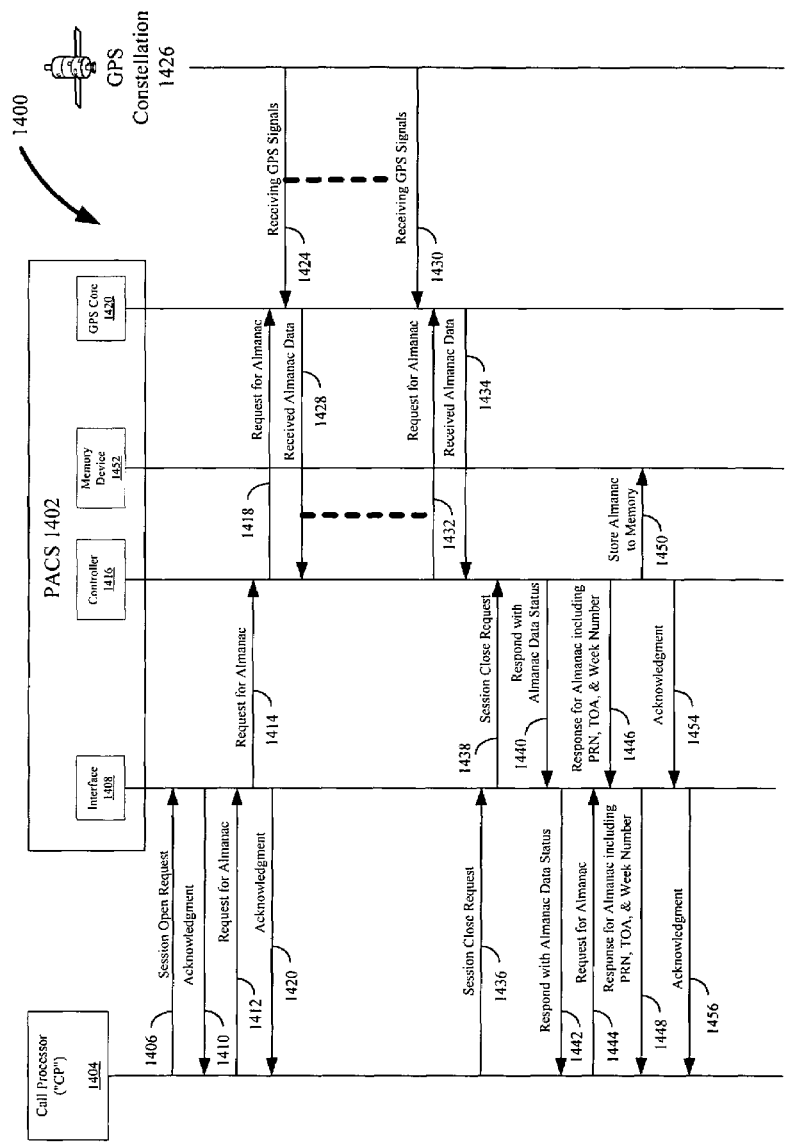
FIG. 14 shows a signal flow diagram for another example non-polling process performed by the PACS shown in FIG. 10.

FIG. 14 shows a signal flow diagram 1400 for another example non-polling process performed by the PACS 1402. In FIG. 14, the PACS 1402 reports a status of partial almanac download as a result of the Call Processor 1404 performing a Session Close (for any reason) before a full almanac download was completed by the PACS 1404. In this exemplary process, the Call Processor 1404 initiates a session with the PACS 1402 and requests an almanac download (such as a piecewise almanac download) from the PACS 1402. The PACS 1402 may receive instructions from the Call Processor 1404 that include parameters of operations such as, but not limited to, instructions to collect satellite almanac when signal conditions are above a certain level (such as greater than 28 dB-Hertz) and indications of the whether the Call Processor 1404 will, or will not, provide any almanac aiding. The PACS 1402 then responds with an acknowledgment to the Call Processor's 1404 request, starts almanac collection, and responds to the Call Processor 1404 with almanac status messages. The Call Processor 1404 then requests almanac update status from the PACS 1402 via message requests. The PACS 1402 responds to the Call Processor 1404 requests with an acknowledgment and starts almanac collection. In this example, however, the Call Processor 1404 then sends a close session request to the PACS 1402 before the PACS 1402 gets a chance to complete the full almanac download. As a result, the PACS 1402 then manages the almanac database and applies any mixed almanac processing and responds to the Call Processor 1404 with a message that indicates whether a partial satellite almanac has been collected by the PACS 1402. The Call Processor 1404 then requests an almanac update status and the PACS 1402 responds by reporting the almanac status for partial almanac data in fields that include almanac PRN, TOA, and Almanac Week number. The PACS 1402 then stores the almanac to a memory device 1452 (such as Flash) and sends an acknowledgment to the Call Processor 1404. At this point, the Call Processor 1404 may determine whether it wants a full almanac status or only the partially collected almanac.

As shown in FIG. 14, the Call Processor 1404 sends an Session Open request 1406 to the PACS 1402 via Interface 1408 (such as the PI2 interface). The PACS 1402 sends an acknowledgment 1410 to the Session Open request 1406. The Call Processor 1404 then sends a request for almanac 1412 to the PACS 1402. The PACS 1402 then passes the almanac request 1414 from the Interface 1408 to the controller 1416, which passes the request 1418 to the GPS core 1420 within the GPS module (not shown) and sends an acknowledgment 1420 to the Call Processor 1404.

The GPS core 1420 then receives the GPS signals 1424 from the GPS constellation 1426. The GPS core 1420 extracts the received almanac data from the received GPS signals 1424 and passes the received almanac data 1428 to the controller 1416. It is appreciated that the GPS Core 1420 is constantly receiving GPS signals 1424 and 1430 from the GPS constellation 1426, and that the Controller 1416 is periodically requesting 1418 and 1432 and receiving 1428 and 1434 almanac data from the GPS core 1420. In this way, the PACS 1402 gathers the piecewise almanac from the GPS constellation 1426. When the Call Processor 1404 sends a Session Close request 1436 to the PACS 1402, the Session Close request 1438 is passed to the Controller 1416. The Controller 1416 then manages the almanac database and applies any mixed almanac processing and responds 1440, via the interface 1408, with response message 1442 to the Call Processor 1404 that indicates whether or not the PACS 1402 has collected a partial almanac for a satellite from the GPS constellation 1426. In response, the Call Processor 1404 requests 1444 an almanac update status from the PACS 1402. The PACS 1402 responds 1446 to the Call Processor 1404 requests with almanac status messages 1448 for the almanac data collected for a satellite (or the satellites) that includes almanac PRN, TOA, and Almanac Week number. The PACS 1402 then passes 1450 the almanac data to storage memory 1452. The Controller 1416 then responds, via 1454 and 1456, to the Call Processor 1402 with an acknowledgment.

Figure 15:
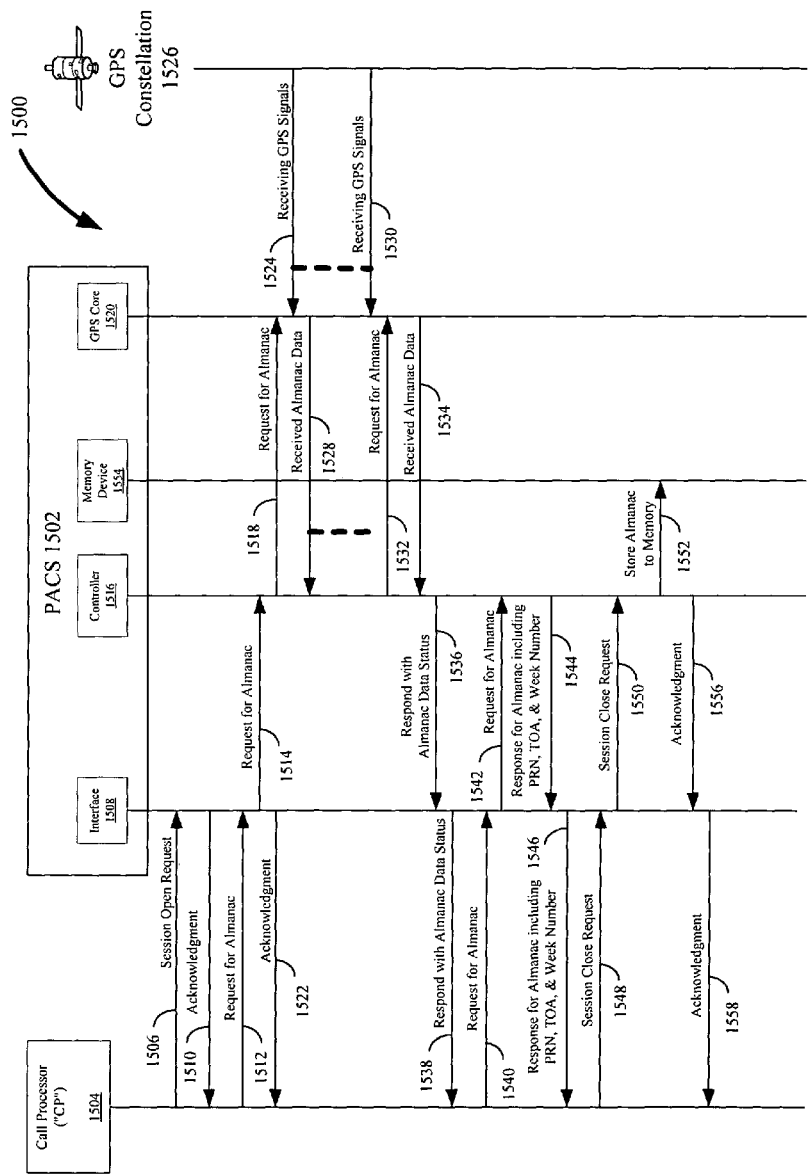
FIG. 15 shows a signal flow diagram for yet another example non-polling process performed by the PACS shown in FIG. 10.

FIG. 15 shows a signal flow diagram 1500 for yet another example non-polling process performed by the PACS 1504. In FIG. 15, the PACS 1502 reports a status of partial almanac download as a result of a change in signal conditions before a full almanac download was completed by the PACS 1504. In this exemplary process, the Call Processor 1504 initiates a session with the PACS 1502 and requests an almanac download (such as a piecewise almanac download) from the PACS 1502. The PACS 1502 may receive instructions from the Call Processor 1504 that include parameters of operations such as, but not limited to, instructions to collect satellite almanac when signal conditions are above a certain level (such as greater than 28 dB-Hertz) and indications of the whether the Call Processor 1504 will, or will not, provide any almanac aiding. The PACS 1502 sends an acknowledgment to the Call Processor 1502 and begins collecting the almanac. In this example, the signals change prior to the PACS 1502 collecting a full almanac. The PACS 1502 then sends a message to the Call Processor 1504 indicating whether it has collected a partial almanac. In response, the Call Processor 1504 requests an almanac update status and the PACS 1504 responds with the almanac status including the almanac status for partial almanac data in fields that include almanac PRN, TOA, and Almanac Week number. The PACS 1504 then manages the almanac database and applies any mixed almanac processing. The Call Processor 1502 then sends a Session Close request. The PACS 1502 then stores the almanac to a memory device 1520 (such as Flash) and sends an acknowledgment to the Call Processor 1504.

As shown in FIG. 15, the Call Processor 1504 sends an Session Open request 1506 to the PACS 1502 via Interface 1508 (such as the PI2 interface). The PACS 1502 sends an acknowledgment 1510 to the Session Open request 1506. The Call Processor 1504 then sends a request for almanac 1512 to the PACS 1502. The PACS 1502 then passes the almanac request 1514 from the Interface 1508 to the Controller 1516, which passes the request 1518 to the GPS core 1520 within the GPS module (not shown) and sends an acknowledgment 1522 to the call processor 1504.

The GPS core 1520 then receives the GPS signals 1524 from the GPS constellation 1526. The GPS core 1520 extracts the received almanac data from the received GPS signals 1524 and passes the received almanac data 1528 to the Controller 1516. It is appreciated that the GPS core 1520 is constantly receiving GPS signals 1524 and 1530 from the GPS constellation 1526, and that the Controller 1516 is periodically requesting 1518 and 1532 and receiving 1528 and 1534 almanac data from the GPS core 1520. In this way, the PACS 1502 gathers the piecewise almanac from the GPS constellation 1526. The PACS 1502 then sends a response message 1536, 1538 to the Call Processor 1504 that indicates whether a partial almanac has been collected. In response, the Call Processor 1504 requests an almanac update status 1540, 1542 and the PACS 1502 responds with the almanac status 1544, 1546 including the almanac status for partial almanac data in fields that include almanac PRN, TOA, and Almanac Week number. The PACS 1502 then manages the almanac database and applies any mixed almanac processing. When the Call Processor 1504 sends a Session Close request 1548 to the PACS 1502, the Session Close request 1550 is passed to the Controller 1516. The PACS 1502 then passes 1552 the almanac data to storage memory 1554. The Controller 1516 then responds, via 1556 and 1558, to the Call Processor 1504 with an acknowledgment.

Figure 16:
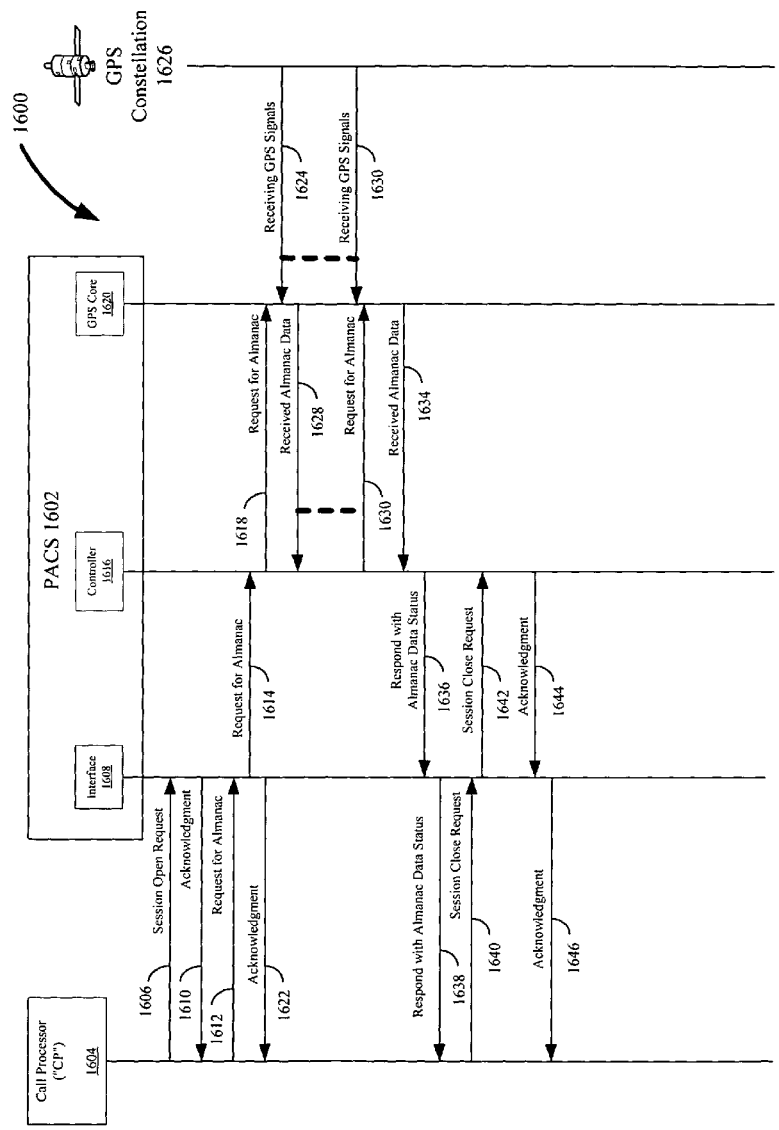
FIG. 16 shows a signal flow diagram for yet another example non-polling process performed by the PACS shown in FIG. 10.

FIG. 16 shows a signal flow diagram 1600 for yet another example non-polling process performed by the PACS 1604. In FIG. 16, the PACS 1602 reports a status of partial almanac download as a result of a change in signal conditions before a full almanac download was completed by the PACS 1604. In this exemplary process, the Call Processor 1604 initiates a session with the PACS 1602 and requests an almanac download (such as a piecewise almanac download) from the PACS 1602. The PACS 1602 may receive instructions from the Call Processor 1604 that include parameters of operations such as, but not limited to, instructions to collect satellite almanac when signal conditions are above a certain level (such as greater than 28 dB-Hertz) and indications of whether the Call Processor 1604 will, or will not, provide any almanac aiding. The PACS 1602 sends an acknowledgment to the Call Processor 1602 and begins collecting the almanac in piecewise fashion. In this example, if the PACS 1602 cannot collect the almanac (such as in weak signal environment) within a predetermined time, the PACS 1602 sends a message to the Call Processor 1604 that an almanac cannot be collected. The Call Processor 1604 responds by sending a Session Close request and the PACS 1602 signals change prior to the PACS 1602 collecting a full almanac. In response, the PACS 1602 returns an acknowledgment to the Call Processor 1604.

As shown in FIG. 16, the Call Processor 1604 sends an Session Open request 1606 to the PACS 1602 via Interface 1608 (such as the PI2 interface). The PACS 1602 sends an acknowledgment 1610 to the Session Open request 1606. The Call Processor 1604 then sends a request for almanac 1612 to the PACS 1602. The PACS 1602 then passes the almanac request 1614 from the Interface 1608 to the Controller 1616, which passes the request 1618 to the GPS core 1620 within the GPS module (not shown) and sends an acknowledgment 1622 to the Call Processor 1604.

The GPS core 1620 then receives the GPS signals 1624 from the GPS constellation 1626. The GPS core 1620 extracts the received almanac data from the received GPS signals 1624 and passes the received almanac data 1628 to the Controller 1616. It is appreciated that the GPS Core 1620 is constantly receiving GPS signals 1624 and 1630 from the GPS constellation 1626, and that the Controller 1616 is periodically requesting 1618 and 1630 and receiving 1628 and 1634 almanac data from the GPS core 1620. In this way, the PACS 1602 attempts to gather the piecewise almanac from the GPS constellation 1626.

If the PACS 1602 cannot collect the almanac within a certain predefined time such as, for example, 5 minutes, the PACS 1602 responds to the Call Processor 1604 with a status message 1636, 1638 that indicates that the PACS 1602 cannot collect the almanac. In response, the Call Processor 1604 sends a Session Close request 1640 to the PACS 1602, the Session Close request 1640 is passed 1642 to the Controller 1616. The Controller 1616 then responds, via 1644 and 1646, to the Call Processor 1602 with an acknowledgment.

The processes described in FIG. 11 through FIG. 16 may be performed by hardware or software. If the process is performed by software, the software may reside in software memory (not shown) in the controller 1012, memory device 1014, Call Processor 1006, GPS module 1008, or an removable memory medium. The software in memory may include an ordered listing of executable instructions for implementing logical functions (i.e., "logic" that may be implement either in digital form such as digital circuitry or source code or in analog form such as analog circuitry or an analog source such an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specifically, "a non-exhaustive list" of the computer-readable medium would include the following: an electrical connection (or an "electronic" connection) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

While various embodiments of the application have been described, it will be apparent to those of ordinary skill in the art that many more embodiments and implementations are possible that are within the scope of this invention. Accordingly, the invention is not to be restricted except in light of the attached claims and their equivalents. The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A method for collecting a Global Positioning System ("GPS") almanac with a partial almanac collection system ("PACS"), the method comprising:
   receiving a request for a GPS almanac download from a call processor; and
   receiving the GPS almanac in a piecewise process at the PACS.

2. The method of claim 1, where the piecewise process includes:
   receiving a plurality of sub-sets of the GPS almanac; and
   storing the plurality of sub-sets of the GPS almanac into a memory device.

3. The method of claim 2, where the piecewise process further includes:
   determining when the last sub-set of the plurality of sub-sets of the GPS almanac has been received; and
   combining all the sub-sets of the plurality of sub-sets of the GPS almanac to create a full GPS almanac.

4. The method of claim 3, where receiving a plurality of sub-sets of the GPS almanac includes receiving the plurality of sub-sets of the GPS almanac at a GPS module.

5. A method for collecting a Global Positioning System ("GPS") almanac with a partial almanac collection system ("PACS"), the method comprising:
   receiving a request from a call processor to perform a piecewise almanac download with the PACS; and
   downloading the almanac in a piecewise process.

6. The method of claim 5, further including determining whether a full almanac was downloaded.

7. The method of claim 6, further including responding to the call processor with a status of full almanac.

8. The method of claim 7, further including receiving an open session request from the call processor.

9. The method of claim 7, further including receiving a close session request from the call processor.

10. The method of claim 8, further including determining whether the call processor requested a close session.

11. The method of claim 6, further including:
    responding to the call processor with a status of collected almanac for each call processor request;
    receiving from the call processor a periodic request to collect almanac;
    downloading a piecewise almanac; and
    determining whether a full almanac was downloaded.

12. The method of claim 11, further including responding to the communication module with a status of full almanac.

13. The method of claim 12, further including receiving an open session request from the call processor.

14. The method of claim 13, further including receiving a close session request from the call processor.

15. The method of claim 5, further including determining whether enough time is available to complete a full almanac download.

16. The method of claim 15, further including reporting status of full almanac to the call processor.

17. The method of claim 16, further including receiving an open session request from the call processor.

18. The method of claim 17, further including receiving a close session request from the call processor.

19. The method of claim 17, further including storing almanac to a memory device.

20. The method of claim 19, further including sending acknowledgment to the call processor.

21. The method of claim 15, further including determining whether the call processor performed a session close before the full almanac was downloaded.

22. The method of claim 21, further including responding to the call processor with a status of partial almanac.

23. The method of claim 21, further including receiving an open session request from the call processor.

24. The method of claim 23, further including receiving a close session request from the call processor.

25. The method of claim 23, further including storing almanac to a memory device.

26. The method of claim 25, further including sending acknowledgment to the call processor.

27. The method of claim 26, further including determining whether the signal conditions changed in a way that caused PACS to collect only a partial almanac.

28. The method of claim 27, further including responding to the call processor with a status of partial almanac.

29. The method of claim 28, further including receiving an open session request from the call processor.

30. The method of claim 29, further including receiving a close session request from the call processor.

31. The method of claim 30, further including storing the almanac to a memory device.

32. The method of claim 31, further including sending an acknowledgment to call processor.

33. The method of claim 27, further including determining whether PACS can collect the entire almanac with a certain time.

34. The method of claim 33, further including responding to call processor that almanac cannot be collected.

35. The method of claim 34, further including receiving an open session request from the call processor.

36. The method of claim 35, further including receiving a close session request from the call processor.

37. The method of claim 35, further including storing almanac to a memory device.

38. The method of claim 37, further including sending an acknowledgment to the call processor.

39. A Global Positioning System ("GPS") almanac with a partial almanac collection system ("PACS") for collecting a Global Positioning System ("GPS") almanac, the PACS comprising:
    means for receiving a request for a GPS almanac download from a call processor; and
    means for receiving the GPS almanac in a piecewise process at the PACS.

40. The PACS of claim 39, where the means for receiving the GPS almanac in a piecewise process includes:
    means for receiving a plurality of sub-sets of the GPS almanac; and
    means for storing the plurality of sub-sets of the GPS almanac into a memory device.

41. The PACS of claim 40, where the means for receiving the GPS almanac in a piecewise process further includes:
   means for determining when the last sub-set of the plurality of sub-sets of the GPS almanac has been received; and
   means for combining all the sub-sets of the plurality of sub-sets of the GPS almanac to create a full GPS almanac.

42. The PACS of claim 41, where the means for receiving a plurality of sub-sets of the GPS almanac includes means for receiving the plurality of sub-sets of the GPS almanac at a GPS module.

43. A partial almanac collection system ("PACS") for collecting a Global Positioning System ("GPS") almanac, the PACS comprising:
   means for receiving a request from a call processor to perform a piecewise almanac download with the PACS; and
   means for downloading the almanac in a piecewise process.

44. The PACS of claim 43, further including means for determining whether a full almanac was downloaded.

45. The PACS of claim 44, further including means for responding to the call processor with a status of full almanac.

46. The PACS of claim 44, further including:
   means for responding to the call processor with a status of collected almanac for each call processor request;
   means for receiving from the call processor a periodic request to collect almanac;
   means for downloading a piecewise almanac; and
   means for determining whether a full almanac was downloaded.

47. The PACS of claim 46, further including means for responding to the communication module with a status of full almanac.

48. The PACS of claim 46, further including means for determining whether enough time is available to complete a full almanac download.

49. The PACS of claim 48, further including means for reporting status of full almanac to the call processor.

50. The PACS of claim 49, further including means for receiving an open session request from the call processor.

51. The PACS of claim 49, further including means for receiving a close session request from the call processor.

52. The PACS of claim 49, further including means for storing almanac to a memory device.

53. The PACS of claim 52, further including means for sending acknowledgment to the call processor.

54. The PACS of claim 48, further including means for determining whether the call processor performed a session close before the full almanac was downloaded.

55. The PACS of claim 54, further including means for responding to the call processor with a status of partial almanac.

56. The PACS of claim 54, further including means for receiving an open session request from the call processor.

57. The PACS of claim 56, further including means for receiving a close session request from the call processor.

58. The PACS of claim 56, further including means for storing almanac to a memory device.

59. The PACS of claim 58, further including means for sending acknowledgment to the call processor.

60. The PACS of claim 59, further including means for determining whether the signal conditions changed in a way that caused PACS to collect only a partial almanac.

61. A signal-bearing medium having software for collecting a Global Positioning System ("GPS") almanac with a partial almanac collection system ("PACS"), the signal-bearing medium comprising:
   logic configured for receiving a request for a GPS almanac download from a call processor; and
   logic configured for receiving the GPS almanac in a piecewise process at the PACS.

62. The signal-bearing medium of claim 61, where the logic configured for receiving the GPS almanac in a piecewise process at the PACS includes:
   logic configured for receiving a plurality of sub-sets of the GPS almanac; and
   logic configured for storing the plurality of sub-sets of the GPS almanac into a memory device.

63. The signal-bearing medium of claim 62, where the logic configured for receiving the GPS almanac in a piecewise process at the PACS includes:
   logic configured for determining when the last sub-set of the plurality of sub-sets of the GPS almanac has been received; and
   logic configured for combining all the sub-sets of the plurality of sub-sets of the GPS almanac to create a full GPS almanac.

64. The signal-bearing medium of claim 63, where the logic configured for receiving a plurality of sub-sets of the GPS almanac includes logic configured for receiving the plurality of sub-sets of the GPS almanac at a GPS module.

65. A signal-bearing medium having software for collecting a Global Positioning System ("GPS") almanac with a partial almanac collection system ("PACS"), the signal-bearing medium comprising:
   logic configured for receiving a request from a call processor to perform a piecewise almanac download with the PACS; and
   logic configured for downloading the almanac in a piecewise process.

66. The signal-bearing medium of claim 65, further including logic configured for determining whether a full almanac was downloaded.

67. The signal-bearing medium of claim 66, further including logic configured for responding to the call processor with a status of full almanac.

68. The signal-bearing medium of claim 67, further including logic configured for receiving an open session request from the call processor.

69. The signal-bearing medium of claim 67, further including logic configured for receiving a close session request from the call processor.

70. The signal-bearing medium of claim 68, further including logic configured for determining whether the call processor requested a close session.

71. The signal-bearing medium of claim 66, further including:
   logic configured for responding to the call processor with a status of collected almanac for each call processor request;
   logic configured for receiving from the call processor a periodic request to collect almanac;
   logic configured for downloading a piecewise almanac; and
   logic configured for determining whether a full almanac was downloaded.

72. The signal-bearing medium of claim 71, further including logic configured for responding to the communication module with a status of full almanac.

73. The signal-bearing medium of claim 72, further including logic configured for receiving an open session request from the call processor.

74. The signal-bearing medium of claim 73, further including logic configured for receiving a close session request from the call processor.

75. The signal-bearing medium of claim 65, further including logic configured for determining whether enough time is available to complete a full almanac download.

76. The signal-bearing medium of claim 75, further including logic configured for reporting status of full almanac to the call processor.

77. The signal-bearing medium of claim 76, further including logic configured for receiving an open session request from the call processor.

78. The signal-bearing medium of claim 77, further including logic configured for receiving a close session request from the call processor.

79. The signal-bearing medium of claim 77, further including logic configured for storing almanac to a memory device.

80. The signal-bearing medium of claim 79, further including logic configured for sending acknowledgment to the call processor.

81. The signal-bearing medium of claim 75, further including logic configured for determining whether the call processor performed a session close before the full almanac was downloaded.

82. The signal-bearing medium of claim 81, further including logic configured for responding to the call processor with a status of partial almanac.

83. The signal-bearing medium of claim 81, further including logic configured for receiving an open session request from the call processor.

84. The signal-bearing medium of claim 83, further including logic configured for receiving a close session request from the call processor.

85. The signal-bearing medium of claim 83, further including logic configured for storing almanac to a memory device.

86. The signal-bearing medium of claim 85, further including logic configured for sending acknowledgment to the call processor.

87. The signal-bearing medium of claim 86, further including logic configured for determining whether the signal conditions changed in a way that caused PACS to collect only a partial almanac.

88. The signal-bearing medium of claim 87, further including logic configured for responding to the call processor with a status of partial almanac.

89. The signal-bearing medium of claim 88, further including logic configured for receiving an open session request from the call processor.

90. The signal-bearing medium of claim 89, further including logic configured for receiving a close session request from the call processor.

91. The signal-bearing medium of claim 90, further including logic configured for storing the almanac to a memory device.

92. The signal-bearing medium of claim 91, further including logic configured for sending an acknowledgment to call processor.

93. The signal-bearing medium of claim 87, further including logic configured for determining whether PACS can collect the entire almanac with a certain time.

94. The signal-bearing medium of claim 93, further including logic configured for responding to call processor that almanac cannot be collected.

95. The signal-bearing medium of claim 94, further including logic configured for receiving an open session request from the call processor.

96. The signal-bearing medium of claim 95, further including logic configured for receiving a close session request from the call processor.

97. The signal-bearing medium of claim 95, further including logic configured for storing almanac to a memory device.

98. The signal-bearing medium of claim 97, further including logic configured for sending an acknowledgment to the call processor.

\* \* \* \* \*